(12) United States Patent
Hamaguchi et al.

(10) Patent No.: US 9,182,061 B2
(45) Date of Patent: Nov. 10, 2015

(54) PIPE JOINT

(75) Inventors: Tamaki Hamaguchi, Tokyo (JP);
Tomoyuki Minami, Tokyo (JP);
Fumitaka Satoh, Tokyo (JP); Takaaki Inotani, Kuwana (JP); Fumikazu Ishibe, Kuwana (JP); Satoru Araki, Kuwana (JP); Youichi Uchiumi, Kawaguchi (JP); Takuji Okiayu, Kuwana (JP); Akihiro Hattori, Kuwana (JP)

(73) Assignees: HITACHI METALS, LTD., Tokyo (JP);
TOKYO GAS CO., LTD., Tokyo (JP);
SANKOH CO., LTD., Saitama (JP)

( * ) Notice: Subject to any disclaimer, the term of this patent is extended or adjusted under 35 U.S.C. 154(b) by 815 days.

(21) Appl. No.: 13/320,145

(22) PCT Filed: May 7, 2010

(86) PCT No.: PCT/JP2010/057832
§ 371 (c)(1),
(2), (4) Date: Nov. 11, 2011

(87) PCT Pub. No.: WO2010/131609
PCT Pub. Date: Nov. 18, 2010

(65) Prior Publication Data
US 2012/0068454 A1 Mar. 22, 2012

(30) Foreign Application Priority Data

May 11, 2009 (JP) ................. 2009-114695

(51) Int. Cl.
*F16L 37/00* (2006.01)
*F16L 25/00* (2006.01)
*F16L 37/088* (2006.01)

(52) U.S. Cl.
CPC ........... *F16L 25/0045* (2013.01); *F16L 37/088* (2013.01); *F16L 2201/10* (2013.01)

(58) Field of Classification Search
CPC .... F16L 37/088; F16L 37/0842; F16L 33/227
USPC .................................. 285/307–310, 321, 243
See application file for complete search history.

(56) References Cited

U.S. PATENT DOCUMENTS 3,439,944 A * 4/1969 Leutenegger .................. 285/321
6,095,570 A * 8/2000 Hagen et al. .................... 285/93

FOREIGN PATENT DOCUMENTS

| JP | 2003-056776 A | 2/2003 |
| JP | 2004-028112 A | 1/2004 |

(Continued)

*Primary Examiner* — Aaron Dunwoody
(74) *Attorney, Agent, or Firm* — Sughrue Mion, PLLC

(57) ABSTRACT

A pipe joint comprising a pressing nut into which a flexible pipe is inserted, a joint body into which the pressing nut is partially inserted, a resilient means unlocked when pushed by a tip end of the flexible pipe, a sealing member, a retainer engaging the flexible pipe, and an engaging mechanism keeping the pressing nut at a predetermined position in the joint body; the engaging mechanism comprising a stop ring, an annular groove formed on an outer surface of the pressing nut for receiving the stop ring, pluralities of engaging grooves formed on an inner surface of the joint body for receiving the stop ring and communicating with each other; the stop ring engaging both of the annular groove and the first engaging groove before the connection of the flexible pipe is completed; and when the flexible pipe is pulled after completing the connection, the stop ring moving from the first engaging groove to the second engaging groove to draw the pressing nut from the joint body, so that the normal connection of the flexible pipe can be confirmed.

6 Claims, 26 Drawing Sheets

(56) References Cited

FOREIGN PATENT DOCUMENTS

| JP | 3538090 B2 | 6/2004 |
|---|---|---|
| JP | 2007-315549 A | 12/2007 |
| JP | 2008-032105 A | 2/2008 |
| JP | 2008-038925 A | 2/2008 |
| JP | 2008-281075 A | 11/2008 |
| JP | 2009-008219 A | 1/2009 |
| JP | 2009-058094 A | 3/2009 |
| JP | 2009-079755 A | 4/2009 |

* cited by examiner

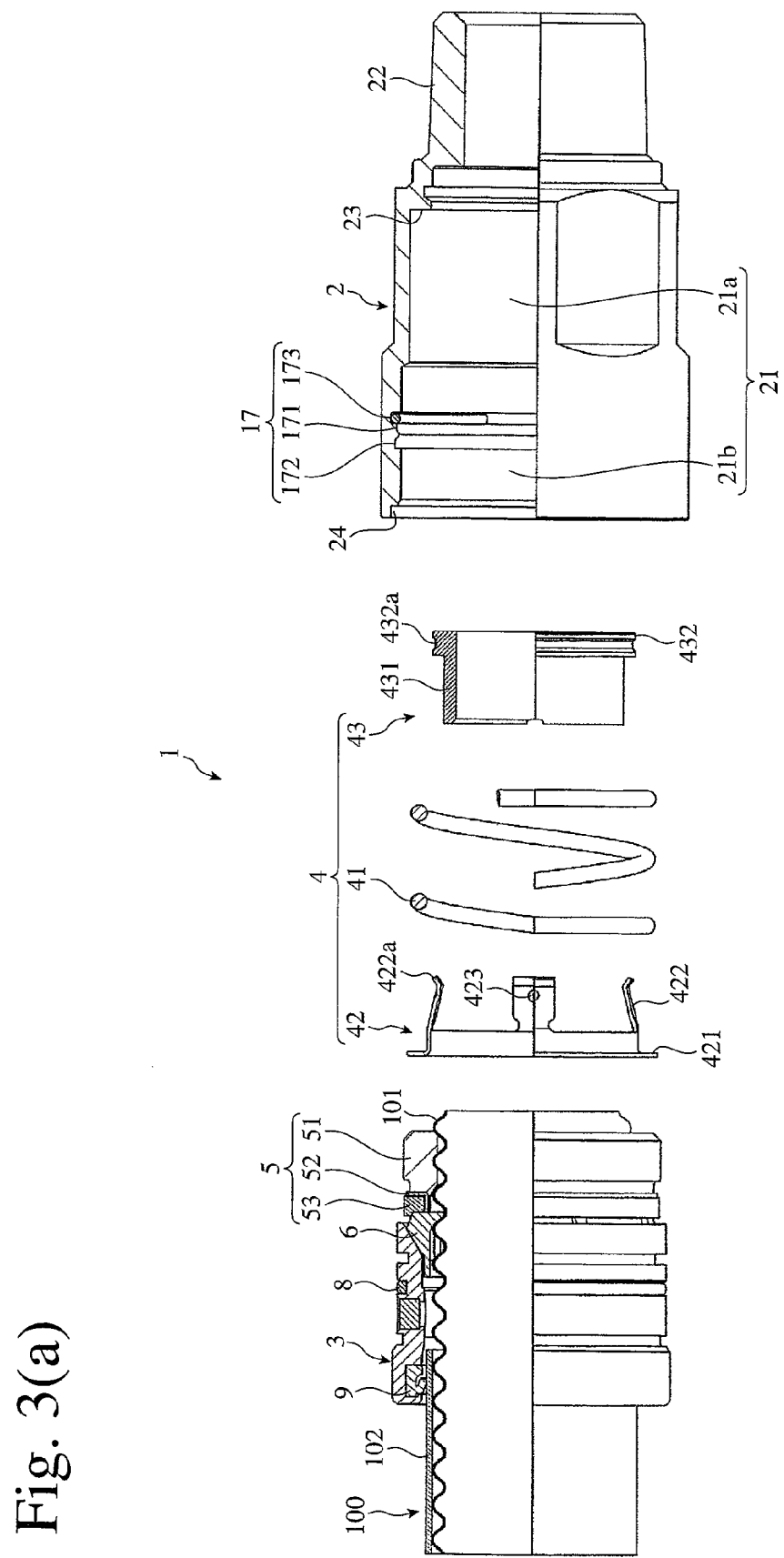

PIPE JOINT

CROSS REFERENCE TO RELATED APPLICATIONS

This application is a National Stage of International Application No. PCT/JP2010/057832, filed on May 7, 2010, which claims priority from Japanese Patent Application No. 2009-114695, filed May 11, 2009, the contents of all of which are incorporated herein by reference in their entirety.

FIELD OF THE INVENTION

The present invention relates to a pipe joint for connecting a flexible pipe used for gas piping, etc.

BACKGROUND OF THE INVENTION

Flexible pipes having corrugated metal pipes coated with resins such as soft vinyl chloride, etc. are used for piping for town gas, etc., and from the aspect of easy operation, one-touch-connectible pipe joints are widely used for the connection of flexible pipes. For pipe joints of this type, sealing between flexible pipes and pipe joints should be kept stably for a long period of time, and the normal connection of flexible pipes to pipe joints should be able to be confirmed. Further, an operation manager should be able to confirm the connection of flexible pipes.

JP 2003-56776 A discloses a flexible pipe joint comprising a means (disk spring) performing a click action in cooperation with a corrugated pipe, when a corrugated flexible pipe is inserted to a predetermined position. However, because the click action is sensed by a worker only temporarily, an operation manager cannot determine from the appearance of the pipe joint after connection whether or not a normal operation has been conducted.

Japanese Patent 3538090 discloses a pipe joint comprising a joint body having a cylindrical guide and a hole, a transparent or translucent protection cover attached to the hole, a nut threaded to the joint body, and a ring, a pipe made of a resin such as polyethylene, etc. being attached to the cylindrical guide with the ring disposed between the nut and the guide, the nut being rotated to cause the ring to push the outer surface of the pipe, so that a tip end portion of the pipe attached to the guide can be observed through the hole by the naked eye. In this pipe joint, however, a worker or an operation manager cannot confirm in a narrow, dark connecting site whether or not a normal connection has been conducted.

JP 2004-28112 A discloses a pipe joint comprising in a joint body, a seal packing closely adhered to a flexible pipe, a locking ring slidably attached to and detached from one end of the seal packing, and a slidable ring having an identification pin and engageable with the locking ring; when a tapered surface of the locking ring abuts a tapered surface of the joint body, the diameter of the locking ring is reduced, so that the identification pin in the sliding ring released from the locking ring projects from the joint body. Because the joint body should have a longitudinal hole for introducing the identification pin for confirming the connection of a flexible pipe, this pipe joint is expensive. Also, because the packing is pressed by the flexible pipe to expand longitudinally, its sealing pressure is likely to decrease.

JP 2009-8219 A discloses a pipe joint comprising in a joint body, a movable piece, a sealing member, a packing having a thick portion and a thin portion, and a compression ring for pressing the thin portion of the packing to reduce its diameter. When a flexible pipe is inserted into the joint body to a predetermined position, the movable piece is detached, so that a sound or a reaction can be sensed. Though this pipe joint can keep good sealing, an operation manager cannot confirm from the appearance of the pipe joint after connection whether or not a normal operation has been conducted.

OBJECT OF THE INVENTION

Accordingly, an object of the present invention is to provide a pipe joint capable of keeping sealing for a long period of time, and enabling an operation manager to surely confirm from the appearance of the pipe joint after connection whether or not a normal operation has been conducted.

DISCLOSURE OF THE INVENTION

The first pipe joint of the present invention comprises a pressing nut into which a pipe is inserted, a joint body into which the pressing nut is partially inserted, a sealing member for sealing the pipe and the joint body, a retainer engaging the pipe to prevent the pipe from being detached, and an engaging mechanism for keeping the pressing nut at a predetermined position in the joint body;

the engaging mechanism comprising a stop ring, an annular groove formed on an outer surface of the pressing nut for receiving the stop ring, and pluralities of engaging grooves formed on an inner surface of the joint body for receiving the stop ring and communicating with each other;

the stop ring engaging both of the annular groove and the first engaging groove until the connection of the pipe is completed; and when a force in a drawing direction is applied to the pipe after completing the connection of the pipe, the stop ring moving from the first engaging groove to the second engaging groove on the inlet side thereof, so that the pressing nut is drawn from the joint body to such an extent that the normal connection of the pipe can be confirmed.

The first pipe joint preferably comprises a resilient means unlocked to expand when pushed by a tip end of the pipe, the sealing member pushed toward the inlet by the expansion of the resilient means sealing the pipe and the joint body.

In the first pipe joint, each of the first and second engaging grooves preferably has a tapered groove, both tapered grooves adjacent to each other forming an annular projection having both inclined side surfaces, the stop ring being movable in both directions between the first engaging groove and the second engaging groove passing the annular projection. A side surface of the annular projection preferably has such an inclination angle that though the stop ring does not pass the annular projection by the action of the resilient means, the stop ring passes the annular projection by a force pulling the flexible pipe for the confirmation of connection.

In the first pipe joint, the pressing nut is preferably provided with an indicator, which is shielded by the joint body until the connection of the pipe is completed; when the pipe is pulled after completing the connection, the pressing nut being drawn from the joint body, and the indicator appearing from the joint body, so that the normal connection of the pipe can be confirmed. The indicator is preferably a ring detachably attached to the pressing nut. The indicator ring is preferably colored to enable confirmation by the naked eye.

It is preferable in the first pipe joint that when the pressing nut is pushed inward the joint body with the indicator ring detached from the pressing nut, the stop ring is received in a third engaging groove on the inward side of the first engaging groove to break engagement with the annular groove, so that the pressing nut can be removed from the joint body.

The first pipe joint is suitable for the connection of flexible pipes.

A preferred example of the first pipe joints comprises a pressing nut into which a flexible pipe is inserted, a joint body into which the pressing nut is partially inserted, a resilient means unlocked to expand when pushed by a tip end of the flexible pipe, a sealing member pushed toward the inlet by the expansion of the resilient means to seal the flexible pipe and the joint body, a retainer pushed by the sealing member to abut the pressing nut, thereby engaging the flexible pipe, and an engaging mechanism for keeping the pressing nut at a predetermined position in the joint body;

the engaging mechanism comprising a stop ring, an annular groove formed on an outer surface of the pressing nut for receiving the stop ring, and pluralities of engaging grooves formed on an inner surface of the joint body for receiving the stop ring and communicating with each other;

the stop ring engaging both of the annular groove and the first engaging groove until the connection of the flexible pipe is completed; and when the flexible pipe is pulled after completing the connection, the stop ring moving from the first engaging groove to the second engaging groove on the inlet side thereof, so that the pressing nut is drawn from the joint body to such an extent that the normal connection of the flexible pipe can be confirmed.

A more preferred example of the first pipe joints comprises a pressing nut into which a flexible pipe is inserted, a joint body into which the pressing nut is partially inserted, a resilient means unlocked to expand when pushed by a tip end of the flexible pipe, a sealing member pushed toward the inlet by the expansion of the resilient means to seal the flexible pipe and the joint body, a retainer pushed by the sealing member to abut the pressing nut, thereby engaging the flexible pipe, an engaging mechanism for keeping the pressing nut at a predetermined position in the joint body, and an indicator ring attached to the pressing nut for confirming the normal connection of the flexible pipe;

the engaging mechanism comprising a stop ring, an annular groove formed on an outer surface of the pressing nut for receiving the stop ring, and a second engaging groove, a first engaging groove and a third engaging groove formed on an inner surface of the joint body in this order from the inlet side such that they receive the stop ring and communicate with each other;

each of the first and second engaging grooves having a tapered groove, both tapered grooves adjacent to each other forming an annular projection having both inclined side surfaces;

the stop ring engaging both of the annular groove and the first engaging groove until the connection of the flexible pipe is completed;

when the flexible pipe is pulled after completing the connection, the stop ring moving from the first engaging groove to the second engaging groove passing the annular projection, so that the pressing nut is drawn from the joint body, and that the indicator ring appears from the joint body, making it possible to confirm the normal connection of the flexible pipe; and when the pressing nut is pushed inward the joint body with the indicator ring detached from the pressing nut, the stop ring moving from the second engaging groove to the third engaging groove, passing the annular projection and the first engaging groove, to break engagement with the annular groove, so that the pressing nut can be removed from the joint body.

The second pipe joint of the present invention comprises a pressing nut into which a pipe is inserted, a joint body into which the pressing nut is partially inserted, a sealing member for sealing the pipe and the joint body, a retainer engaging the pipe to prevent the pipe from being detached, and an engaging mechanism for keeping the pressing nut at a predetermined position in the joint body;

the engaging mechanism comprising a stop ring, an annular groove formed on an outer surface of the pressing nut for receiving the stop ring, and pluralities of engaging grooves formed on an inner surface of the joint body for receiving the stop ring and communicating with each other;

the stop ring engaging both of the annular groove and the first engaging groove until the connection of the pipe is completed; and when the pipe is connected to the pipe joint, the stop ring moving from the first engaging groove to the second engaging groove on the inlet side thereof, so that it is held by both of the annular groove and the second engaging groove.

The second pipe joint preferably comprises a resilient means unlocked to expand when pushed by a tip end of the pipe, the sealing member pushed toward the inlet by the expansion of the resilient means sealing the pipe and the joint body.

In the second pipe joint, each of the first and second engaging grooves preferably has a tapered groove, both tapered grooves adjacent to each other forming an annular projection having both inclined side surfaces, the stop ring being movable in both directions between the first engaging groove and the second engaging groove passing the annular projection. A side surface of the annular projection preferably has such an inclination angle that the stop ring passes the annular projection by the action of the resilient means.

It is preferable in the second pipe joint that the pressing nut is provided with an indicator, which is shielded by the joint body before the connection of the pipe, and that when the pipe is connected to the pipe joint, the indicator appears from the joint body, so that the normal connection of the pipe can be confirmed. The indicator is preferably a color layer or a detachable ring. The indicator ring is preferably colored to enable confirmation by the naked eye.

In the second pipe joint, when the pressing nut is pushed inward the joint body with the indicator ring detached from the pressing nut, the stop ring is preferably received in a third engaging groove on the inward side of the first engaging groove to break engagement with the annular groove, so that the pressing nut can be removed from the joint body.

The second pipe joint is suitable for the connection of flexible pipes.

A preferred example of the second pipe joints comprises a pressing nut into which a flexible pipe is inserted, a joint body into which the pressing nut is partially inserted, a resilient means unlocked to expand when pushed by a tip end of the flexible pipe, a sealing member pushed toward the inlet by the expansion of the resilient means to seal the flexible pipe and the joint body, a retainer pushed by the sealing member to abut the pressing nut, thereby engaging the flexible pipe, and an engaging mechanism for keeping the pressing nut at a predetermined position in the joint body;

the engaging mechanism comprising a stop ring, an annular groove formed on an outer surface of the pressing nut for receiving the stop ring, and pluralities of engaging grooves formed on an inner surface of the joint body for receiving the stop ring and communicating with each other;

the stop ring engaging both of the annular groove and the first engaging groove before the resilient means is pushed by a tip end of the flexible pipe to expand; and when the flexible pipe is connected to the pipe joint by the expansion of the resilient means, the stop ring moving from the first engaging groove to the second engaging groove on the inlet side thereof, so that it is held by both of the annular groove and the second engaging groove.

A more preferred example of the second pipe joints comprises a pressing nut into which a flexible pipe is inserted, a joint body into which the pressing nut is partially inserted, a resilient means unlocked to expand when pushed by a tip end of the flexible pipe, a sealing member pushed toward the inlet by the expansion of the resilient means to seal the flexible pipe and the joint body, a retainer pushed by the sealing member to abut the pressing nut, thereby engaging the flexible pipe, an engaging mechanism for keeping the pressing nut at a predetermined position in the joint body, and an indicator ring attached to the pressing nut for confirming the normal connection of the flexible pipe;

the engaging mechanism comprising a stop ring, an annular groove formed on an outer surface of the pressing nut for receiving the stop ring, and a second engaging groove, a first engaging groove and a third engaging groove formed on an inner surface of the joint body in this order from the inlet side such that they receive the stop ring and communicate with each other;

each of the first and second engaging grooves having a tapered groove, both tapered grooves adjacent to each other forming an annular projection having both inclined side surfaces;

the stop ring engaging both of the annular groove and the first engaging groove before connecting with the flexible pipe;

when the flexible pipe is connected to the pipe joint by the expansion of the resilient means, the stop ring moving from the first engaging groove to the second engaging groove passing the annular projection, and the indicator ring appearing from the joint body, making it possible to confirm the normal connection of the flexible pipe; and when the pressing nut is pushed inward the joint body with the indicator ring detached from the pressing nut, the stop ring moving from the second engaging groove to the third engaging groove, passing the annular projection and the first engaging groove, to break engagement with the annular groove, so that the pressing nut can be removed from the joint body.

BRIEF DESCRIPTION OF THE DRAWINGS

FIG. 3(a) is an exploded, partially cross-sectional side view showing a pipe joint according to the first embodiment.

DESCRIPTION OF THE PREFERRED EMBODIMENTS

Figure 1:
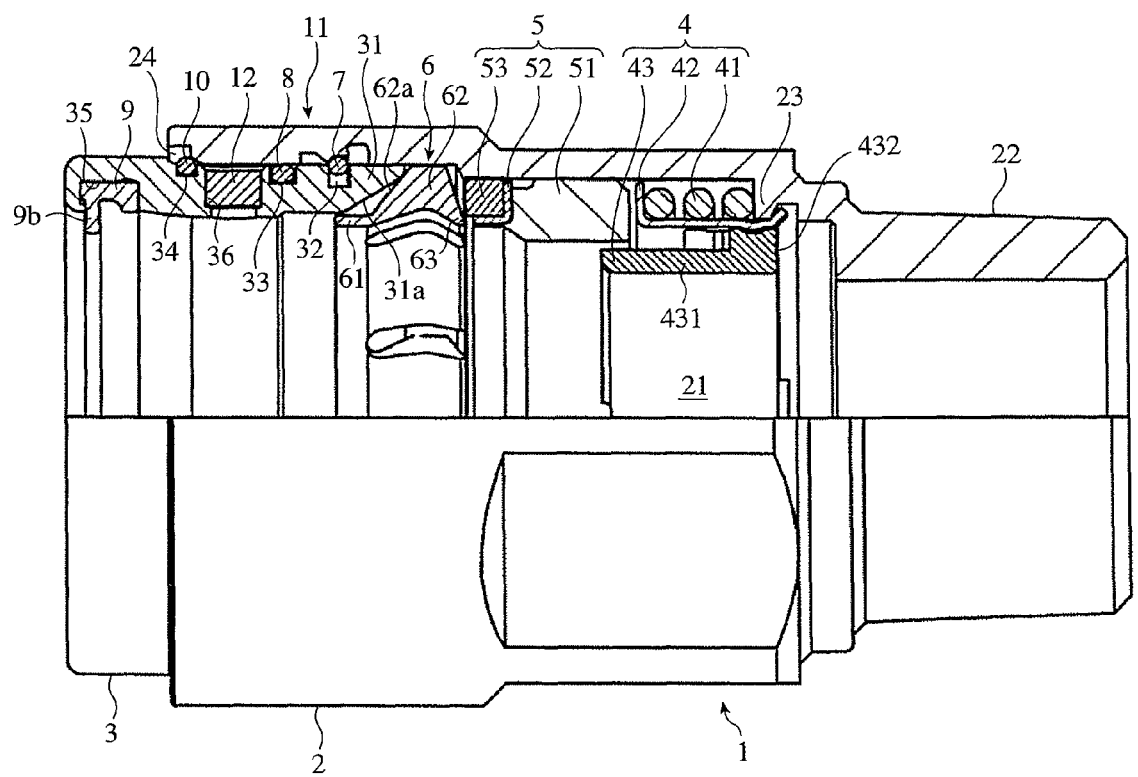
FIG. 1 is a partially cross-sectional side view showing a pipe joint according to the first embodiment.

The embodiments of the present invention will be explained in detail referring to the attached drawings. The explanation of each embodiment is valid to other embodiments unless otherwise particularly mentioned. The same parts and portions in all embodiments are provided with the same reference numerals.

[1] Pipe Joint in First Embodiment

This pipe joint has a structure capable of conducting the connection step of a flexible pipe and the confirmation step of the normal connection of the flexible pipe by two actions. With the connection step and the connection-confirming step divided, a worker can connect the flexible pipe with confirmation easily and surely even in a narrow, dark connecting site, and an operation manager can surely confirm from the appearance of the pipe joint after connection whether or not a normal connection has been conducted. Particularly because the connection step and the connection-confirming step are conducted by two actions, a worker does not forget the confirmation of connection.

(1) Structure

As shown in FIGS. 1-4, the pipe joint 1 according to the first embodiment of the present invention comprises a joint body 2 having an inner hole 21 into which a flexible pipe (for example, a resin-coated, corrugated metal pipe) is inserted from one end side, and a male screw portion 22 on the other end side; a pressing nut 3 partially inserted into the joint body 2; a resilient means 4 disposed inside the joint body 2; a first sealing member 5; a retainer 6; a stop ring 7; a second sealing member 8; a third sealing member 9; and an indicator ring 10.

(a) Joint Body

As shown in FIG. 3, the inner hole 21 of the joint body 2 comprises a first inner diameter portion 21a having a larger inner diameter than that of the male screw portion 22 and slidably receiving the resilient means 4 and the sealing member 5, and a second inner diameter portion 21b having a larger inner diameter than that of the first inner diameter portion 21a and slidably receiving the retainer 6 and the pressing nut 3, in this order from the side of the male screw portion 22, with an inner, annular projection 23 provided at the deepest end of the first inner diameter portion 21a, and an annular groove 24 provided at the inlet-side end of the second inner diameter portion 21b. The second inner diameter portion 21b is provided with first to third engaging grooves 171, 172, 173, into which the stop ring 7 is received movably in a longitudinal direction.

(b) Pressing Nut

Figure 4A:
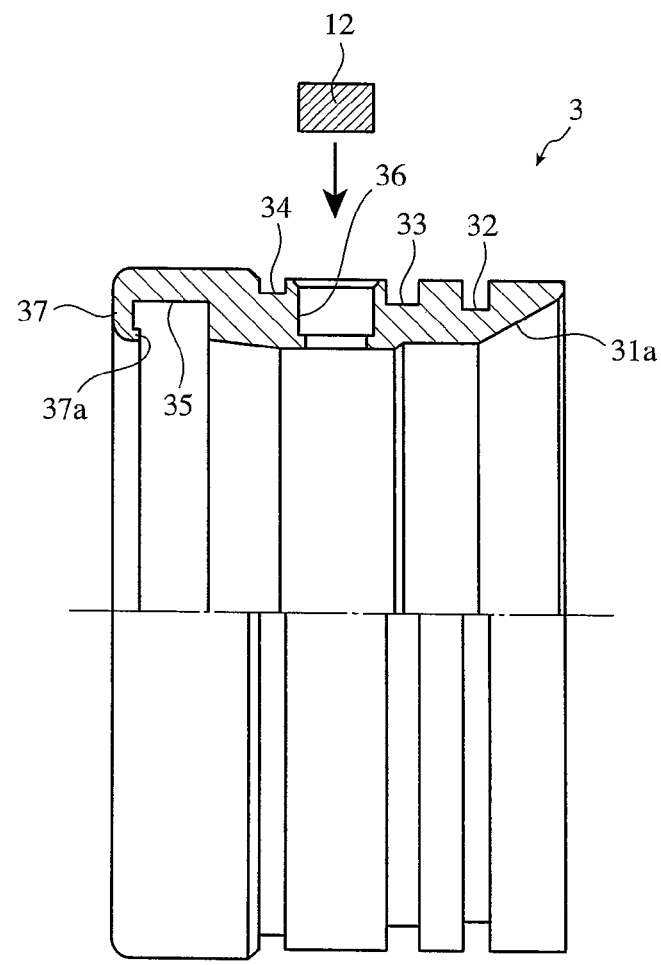
FIG. 4(a) is a partially cross-sectional side view showing a pressing nut included in the pipe joint according to the first embodiment.

As shown in FIG. 4(a), the pressing nut 3 comprises a tip end portion 31 having a tapered surface 31a abutting the retainer 6, a peripheral, annular groove 32 receiving the stop ring 7, a peripheral, annular groove 33 receiving a second circular sealing member 8, an annular groove 34 receiving the indicator ring 10 at a position near the inlet end of the joint body 2, an inner, annular groove 35 receiving a third circular sealing member 9, a pore (for example, circular pore) 36 communicating with the outside near the inlet end of the joint body 2, and an inner flange 37 provided at the inlet end for defining the inner, annular groove 35. An inner end portion of the inner flange 37 is an inwardly bent portion 37a (bent to the side of the inner, annular groove 35). A selectively permeable member 12 is fit into the communicating pore 36. To avoid undesired sliding before or during the connection operation, the pressing nut 3 preferably has such a smooth peripheral surface that it is not easily gripped by the hand.

(c) Resilient Means

The resilient means 4 disposed between the joint body 2 and the pressing nut 3 is locked in the joint body 2 before the connection of a flexible pipe 100, and unlocked when the flexible pipe 100 is inserted deep into the joint body 2, to push the first sealing member 5 in an opposite direction to the insertion direction of the flexible pipe 100, thereby abutting the retainer 6 to a tapered tip end surface 31a of the pressing nut 3. As shown in FIG. 3, the resilient means 4 comprises a compression coil 41 (in a compressed state in FIG. 1), a substantially cylindrical guide member 42 having an L-shaped cross section, and a substantially cylindrical sliding member 43 movable inside the guide member 42 in a longitudinal direction.

Figure 3B:
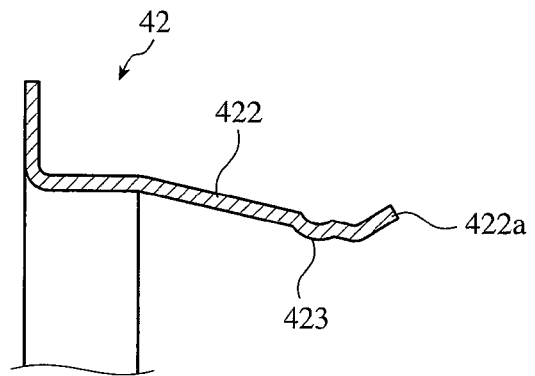
FIG. 3(b) is a partial, enlarged cross-sectional view showing each arcuate plate of the guide member shown in FIG. 3(a).

As shown in FIG. 3(a), the guide member 42 formed by a resilient metal plate comprises a hollow, disc-shaped support portion 421, and pluralities of arcuate plates 422 extending longitudinally and slightly inwardly from the hollow, disc-shaped support portion 421 at circumferential positions thereof. Each arcuate plate 422 has a slightly outwardly bent portion 422a at a tip end thereof. As shown in FIG. 3(b), the bent portion 422a of each arcuate plate 422 has small projections 423 on the outer surface. The sliding member 43 comprises a cylindrical portion 431, and a thick flange 432 extending from an end of the cylindrical portion 431. A peripheral surface of the flange 432 has an annular recess 432a for receiving the small outer projection 423 of the bent portion 422a of the arcuate plate 422. For smooth sliding, the sliding member 43 is preferably made of materials having low specific gravities, high strength and low friction coefficients, such as engineering plastics.

As shown in FIG. 1, in a state before the flexible pipe 100 is inserted into the joint body 2, the compression coil 41 is held in a compressed state between the hollow, disc-shaped support portion 421 of the guide member 42 and the inner, annular projection 23 of the joint body 2, so that the bent tip end portions 422a of the arcuate plates 422 of the guide member 42 engage the inner, annular projection 23. With the sliding member 43 disposed inside the guide member 42, the arcuate plates 422 of the guide members 42 are gripped between the inner, annular projection 23 of the joint body 2 and the flange 432 of the sliding member 43. In order that power of gripping the arcuate plates 422 of the guide member 42 by the inner, annular projection 23 and the flange 432 is larger than the resilient force of the compression coil 41, the inner diameter of the inner, annular projection 23, the outer diameter of the flange 432 and the thickness of the arcuate plates 422 are determined.

(d) First Sealing Member

The first sealing member 5 for sealing a tip end portion of a corrugated metal pipe 101 comprises a gas-tight packing 51 made of rubbers, etc., a metal guide 52 having an L-shaped cross section and fixed to the packing 51, and a fire-resistant packing 53 seated on the guide 52. The gas-tight packing 51 has not only a slightly larger outer diameter than the inner diameter of the first inner diameter portion 21*a* to ensure its close adhesion to the first inner diameter portion 21*a* of the joint body 2, but also a slightly smaller inner diameter than the outer diameter (outer diameter of ridges) of the corrugated metal pipe 101. The gas-tight packing 51 has such length as to seal several ridges (for example, two ridges) of the corrugated metal pipe 101, thereby ensuring the gas-tight sealing of the peripheral surface of the corrugated metal pipe 101. Because the packing 51 should keep sealing for a long period of time, it is preferably made of nitrile-butadiene rubber (NBR), etc. having excellent gas impermeability.

Even if the gas-tight packing 51 is burned out with the pipe joint 1 exposed to high temperatures by flame, etc., the rubber-made, fire-resistant packing 53 is thermally expanded to fill a gap between the joint body 2 and the corrugated metal pipe 101, preventing gas leakage. Also, when the packing 51 is burned out, the resilient means 4 expands to abut the guide member 42, limiting the movement of the thermally expanded fire-resistant packing 53, thereby ensuring sealing between the inner surface of the joint body 2 and the peripheral surface of the corrugated metal pipe 101.

The fire-resistant packing 53 is produced, for example, by curing a blend of rubber such as natural rubber (NR), nitrile-butadiene rubber (NBR), chloroprene rubber (CR), ethylene-propylene rubber (EPR), ethylene-propylene-diene rubber (EPDM), silicone rubber (SR), etc., a graphite intercalation compound thermally expandable in an unfoamed state, a curing agent, and if necessary, fillers, a softening agent, etc. The graphite intercalation compound is obtained, for example, by treating graphite with sulfuric acid. The graphite intercalation compound expands several times to several tens of times in an unfoamed state when heated to 170° C. or higher, and its apparent volume increases 100-250 times when heated to 800-1000° C. The volume of the fire-resistant packing 53 and the amount of the graphite intercalation compound added are preferably determined, taking into consideration the expansion of the fire-resistant packing 53 and the gas permeability of the expanded fire-resistant packing 53. From the aspect of sealing, the fire-resistant packing 53 preferably has Shore A hardness of 50-80.

(e) Retainer

Figure 2:
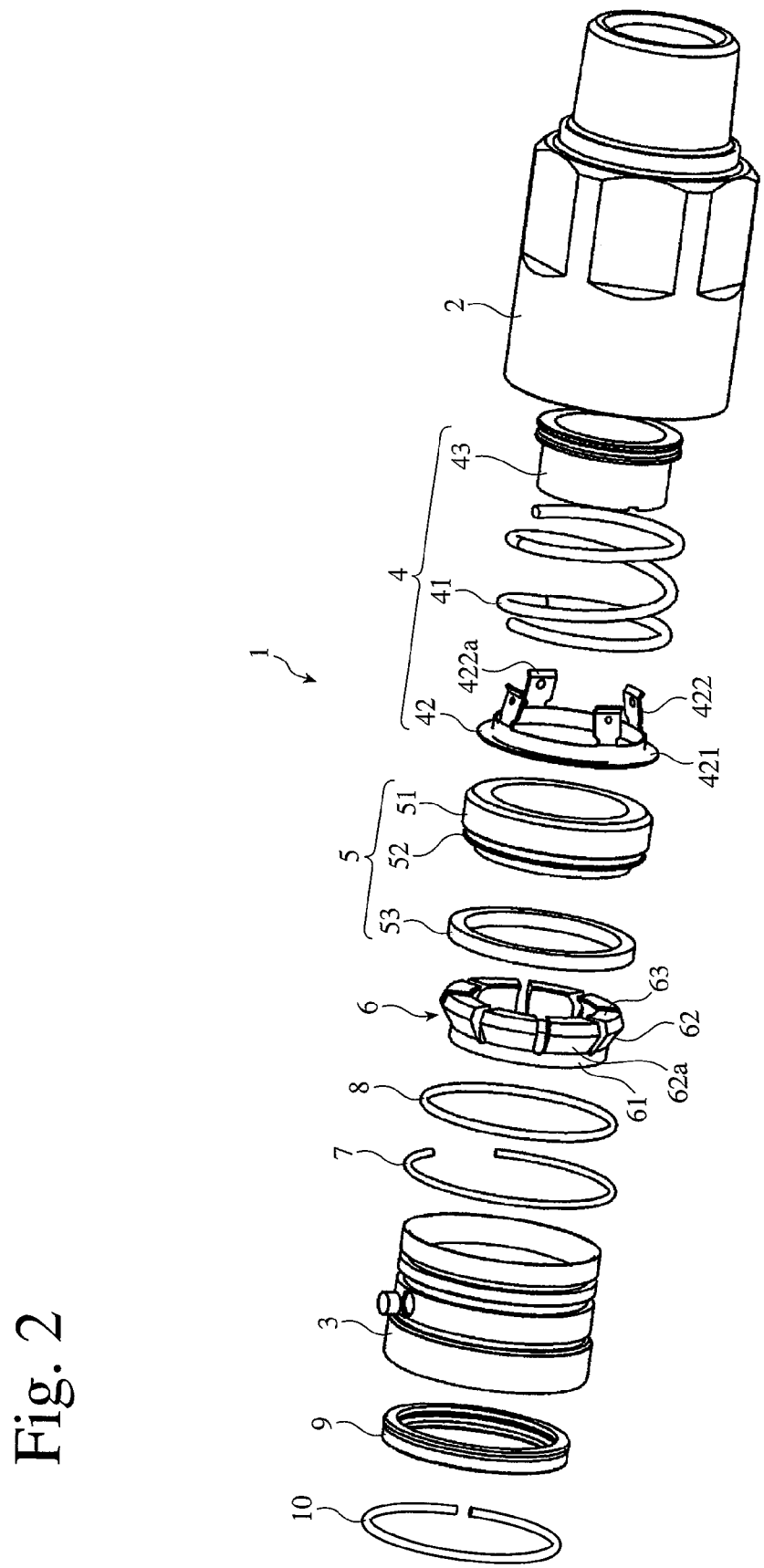
FIG. 2 is an exploded perspective view showing a pipe joint according to the first embodiment.

As shown in FIGS. 1 and 2, the retainer 6 made of resiliently deformable materials (for example, engineering plastics) comprises a cylindrical base portion 61, pluralities of segments 62 extending from the cylindrical base portion 61 with equal circumferential intervals, and a nail portion 63 provided at a tip end of each segment 62 and made of a metal (for example, brass). An outer surface of each segment 62 is a tapered surface 62*a* abutting the tapered tip end surface 31*a* of the pressing nut 3. Having larger inner diameters than the outer diameter of ridges of the corrugated metal pipe 101, the cylindrical base portion 61 and segments 62 of the retainer 6 do not hinder the insertion of the flexible pipe 100 in an unloaded state. However, with slits between the segments 62, the segments 62 are bent inwardly when the tapered surfaces 62*a* of the segments 62 are pressed by the tapered tip end surface 31*a* of the pressing nut 3 by a restoring force of the compression coil 41 as described later. As a result, the nail portions 63 provided at tip ends of the segments 62 engage the valleys of the corrugated metal pipe 101.

(f) Stop Ring

The stop ring 7 is a resiliently deformable C-shaped member engaging any one of first to third engaging grooves 171, 172, 173 of the joint body 2 depending on the operation steps, to hold (lock) the pressing nut 3 at any one of plural positions of the joint body 2. To exhibit this function effectively, the stop ring 7 is preferably formed by a resilient wire of a metal such as austenitic stainless steel.

(g) Second Sealing Member

The second sealing member 8 received in the peripheral, annular groove 33 of the pressing nut 3 is closely adhered to the joint body 2, providing sealing between the pressing nut 3 and the joint body 2, thereby preventing the intrusion of rainwater. The second sealing member 8 is preferably an O-ring made of, for example, olefinic rubber such as ethylene-propylene-diene rubber (EPDM), etc.

(h) Third Sealing Member

Figure 4B:
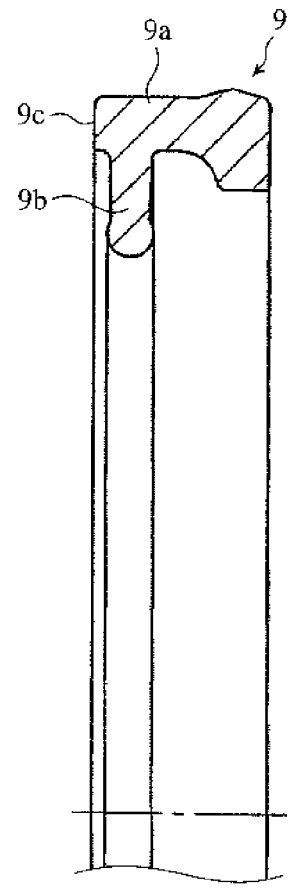
FIG. 4(b) is a cross-sectional view showing a third sealing member included in the pipe joint according to the first embodiment.
Figure 4C:
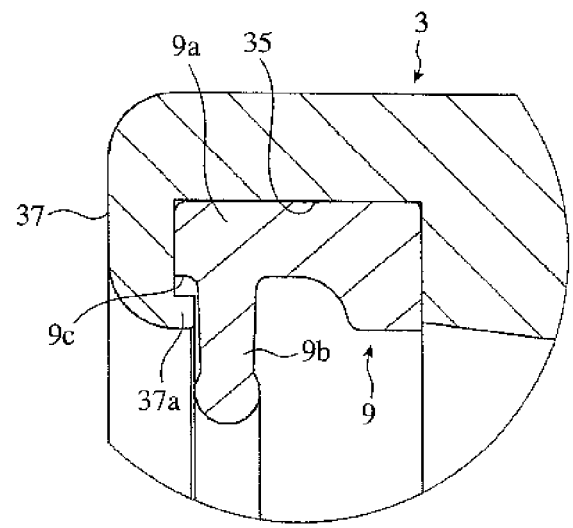
FIG. 4(c) is a partial cross-sectional view showing the third sealing member of FIG. 4(b), which is received in an inner, annular groove of the pressing nut.

As shown in FIG. 4(*b*), the third sealing member 9 received in the inner, annular groove 35 of the pressing nut 3 is preferably a lip packing having a substantially L-shaped cross section, and comprising an annular body 9*a* fit into the inner, annular groove 35, and an inner lip 9*b* extending from the annular body 9*a*. Because this lip packing having an L-shaped cross section is longitudinally shorter than a lip packing having a T-shaped cross section used in the second pipe joint as described later, it is effective for making the pipe joint smaller. The lip packing is preferably made of, for example, olefinic rubber such as EPDM, etc.

The annular body 9*a* has a step portion 9*c* extending from the inner lip 9*b* outward (on the side of the inner flange 37). As shown in FIG. 4(*c*), the step portion 9*c* of the third sealing member 9 engages the outwardly bent portion 37*a* of the inner flange 37. When the flexible pipe 100 is inserted into the pressing nut 3, the inner lip 9*b* is resiliently bent toward the deeper side, pressing the flexible pipe 100 at a desired sealing surface pressure. As a result, sealing is obtained between the pressing nut 3 and the flexible pipe 100, preventing the intrusion of rainwater. The insertion of the flexible pipe 100 applies stress to the third sealing member 9 toward the deeper side, but the step portion 9*c* of the third sealing member 9 engaging the outwardly bent portion 37*a* prevents the third sealing member 9 from detaching from the inner, annular groove 35.

(i) Indicator Ring

To confirm the completion of connecting the flexible pipe 100 to the pipe joint 1, and to facilitate the operation of disassembling the pipe joint 1 having the flexible pipe 100 inserted, the indicator ring 10 is detachably mounted to the peripheral, annular groove 34 of the pressing nut 3. The indicator ring 10 is a metal-made, C-shaped ring having a smaller inner diameter than the outer diameter of the peripheral, annular groove 34 in an unloaded state. In a state where the pressing nut 3 is inserted into the joint body 2, the indicator ring 10 is covered by the annular groove 24 at the inlet end of the joint body 2, so that it cannot be seen from outside. However, when the pressing nut 3 is pulled to confirm the completion of connecting the flexible pipe 100 to the pipe joint 1, the stop ring 7 enters the second engaging groove 172 as described later, and the indicator ring 10 appears from the annular groove 24 of the joint body 2. In order that the complete connection of the flexible pipe 100 to the pipe joint 1 can be confirmed by the naked eye, the indicator ring 10 preferably has a different color from those of the joint body 2 and the pressing nut 3.

(j) Selectively Permeable Member

To detect gas leakage occurring, for example, when a nail is erroneously hit into the corrugated pipe 101 during the piping operation, the communicating pore 36 of the pressing nut 3 is provided with the selectively permeable member 12. Because the leaked gas flows into a gap between the corrugated pipe 101 and the resin coating 102, it passes through the selectively permeable member 12 toward outside, so that it can be detected by a gas sensor, etc. The selectively permeable member 12 is a porous member having gas permeability but preventing the intrusion of moisture, dust, etc. for a long period of time after piping. Such porous member is preferably a porous body made of polymers such as polyolefins (polyethylene, polypropylene, etc.), polymethyl methacrylate, polystyrenes, ethylene-vinyl acetate copolymers, polytetrafluoroethylene, etc.

(k) Engaging Mechanism

Figure 5A:
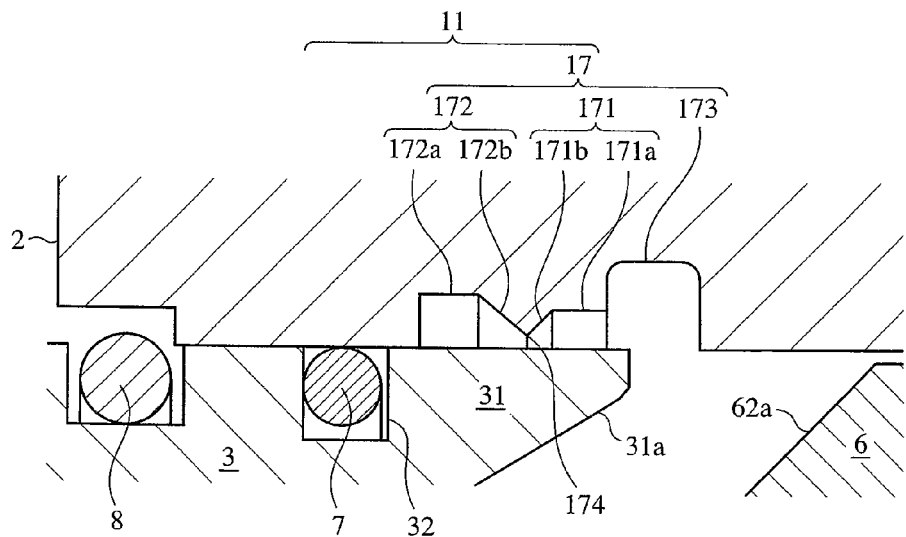
FIG. 5(a) is a cross-sectional view showing the positional relation between a stop ring and engaging grooves when the pressing nut starts to enter the joint body in the first embodiment.
Figure 5B:
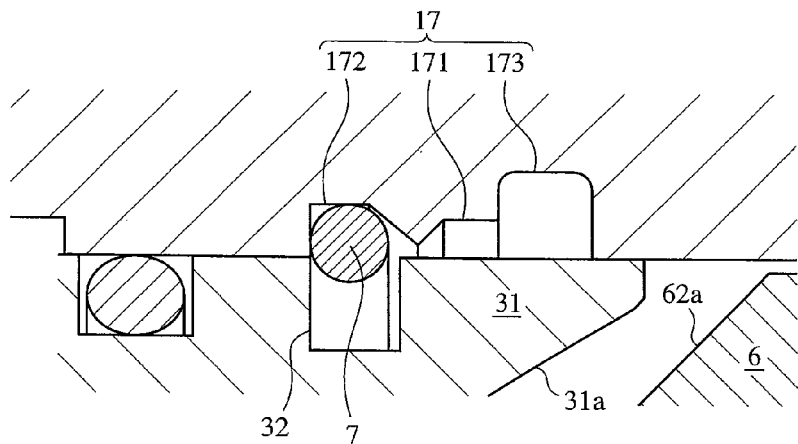
FIG. 5(b) is a cross-sectional view showing the positional relation between a stop ring and engaging grooves while the pressing nut is being inserted into the joint body in the first embodiment.
Figure 5C:
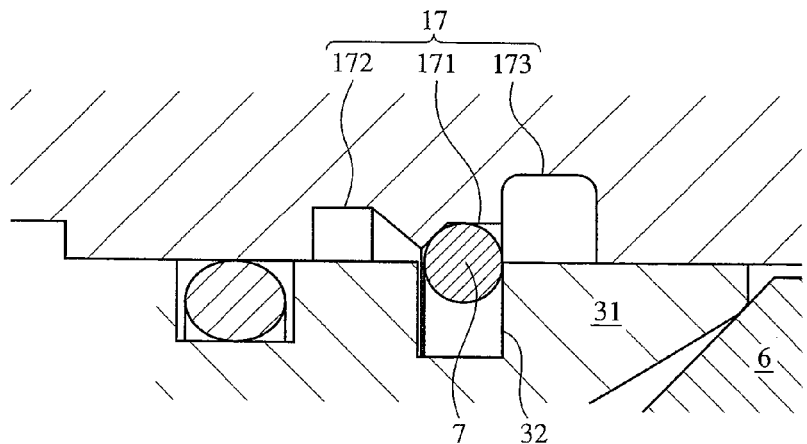
FIG. 5(c) is a cross-sectional view showing the positional relation between a stop ring and engaging grooves when the pressing nut has been inserted into the joint body until it abuts the retainer in the first embodiment.
Figure 5D:
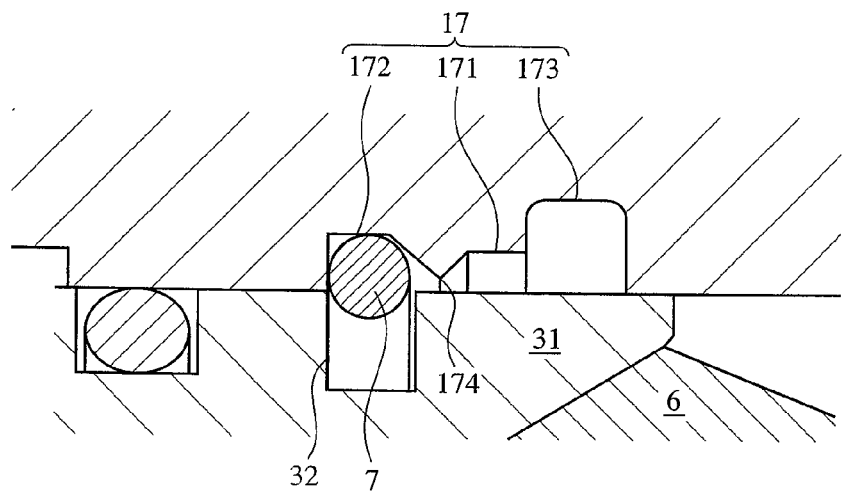
FIG. 5(d) is a cross-sectional view showing the positional relation between a stop ring and engaging grooves after the connection-confirming step of the flexible pipe in the first embodiment.
Figure 5E:
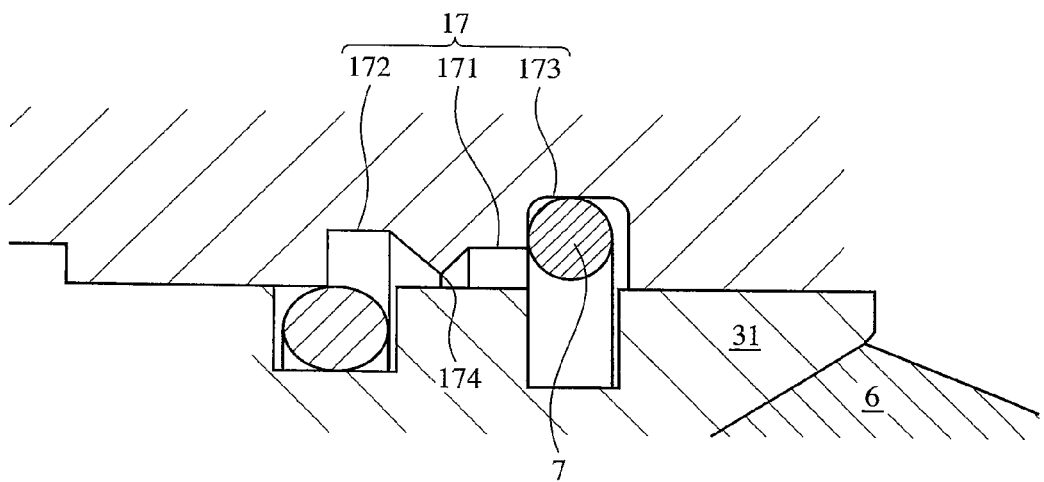
FIG. 5(e) is a cross-sectional view showing the positional relation between a stop ring and engaging grooves when the pipe joint is disassembled in the first embodiment.
Figure 6:
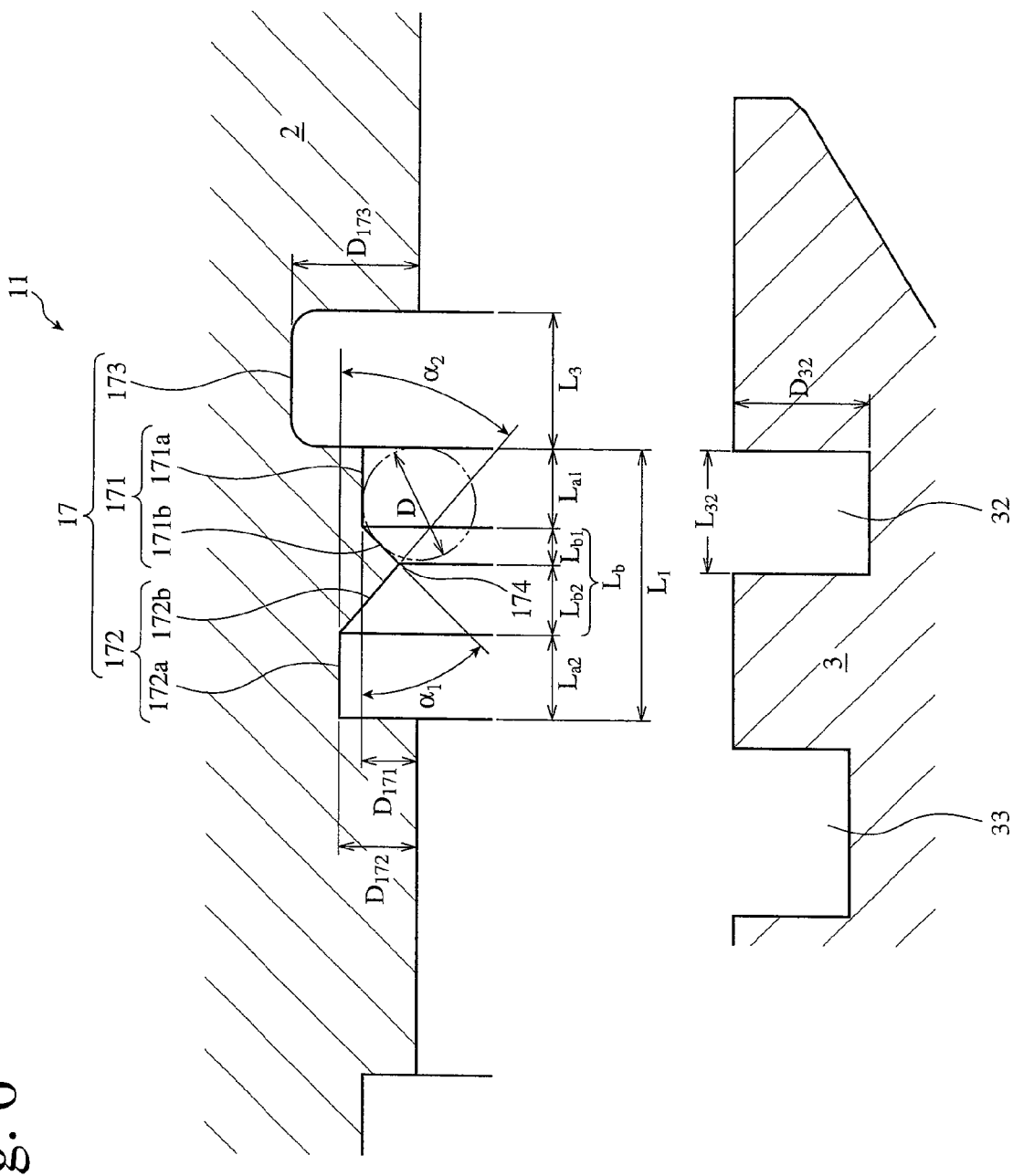
FIG. 6 is a cross-sectional view showing the shapes and sizes of first to third engaging grooves in the joint body, and peripheral, annular grooves in the pressing nut in the first embodiment.

As shown in FIGS. 5 and 6, the engaging mechanism 11 comprises an engaging groove assembly 17 comprising first to third engaging grooves 171, 172, 173 communicating with each other on the inner surface of the joint body 2, and a peripheral, annular groove 32 of the pressing nut 3. As shown in FIG. 6, the first engaging groove 171 is constituted by an annular groove 171a (longitudinal length: $La_1$), and a tapered groove 171b (longitudinal length: $Lb_1$, taper angle: $\alpha_1$) having a tapered surface with a diameter decreasing from the inner surface of the annular groove 171a toward the inlet side (left side in FIG. 6). The second engaging groove 172 communicating with the tapered groove 171b of the first engaging groove 171 is constituted by a tapered groove 172b (length: $Lb_2$, taper angle: $\alpha_2$) having a tapered surface with a diameter increasing toward the inlet side, and an annular groove 172a (longitudinal length: $La_2$) having an inner surface connected to the tapered groove 172b. The tapered groove 171b of the first engaging groove 171 and the tapered groove 172b of the second engaging groove 172 form an inner, annular, triangular projection 174 (length Lb). The third engaging groove 173 (longitudinal length: $L_3$) is communicating with the annular groove 171a of the first engaging groove 171.

In order that the stop ring 7 can smoothly move from the first engaging groove 171 to the second engaging groove 172 by the insertion operation of the flexible pipe 100, the total length $L_1$ of the first engaging groove 171 and the second engaging groove 172 is more than 2 times the diameter D of the stop ring 7.

Because the first and second engaging grooves 171, 172 are connected via the inner, annular, triangular projection 174, the application of a force making the diameter of the stop ring 7 smaller than the inner diameter of the inner, annular projection 174 to the pressing nut 3 can move the stop ring 7 from the first engaging groove 171 to the second engaging groove 172, or from the second engaging groove 172 to the first engaging groove 171. With an insufficient force to reduce the diameter of the stop ring, however, the inner, annular projection 174 prevents the stop ring 7 received in the first engaging groove 171 from moving to the second engaging groove 172.

Though FIG. 6 indicates the same taper angles $\alpha_1$ and $\alpha_2$, they may be different. With too large taper angles $\alpha_1$, $\alpha_2$, the stop ring 7 does not move easily. With too small taper angles $\alpha_1$, $\alpha_2$, the stop ring 7 is not surely held in the first or second engaging groove 171, 172.

In the first embodiment, the inclination angles (taper angles) $\alpha_1$, $\alpha_2$ of the side surfaces of the inner, annular projection 174 should be determined, such that (a) the stop ring 7 is retained in the first engaging groove 171 in the connection step of the flexible pipe 100, and that (b) in the step of confirming the connection of the flexible pipe 100, the stop ring 7 moves from the first engaging groove 171 to the second engaging groove 172 passing the inner, annular projection 174. In other words, each taper angle $\alpha_1$, $\alpha_2$ should be relatively large such that (a) the stop ring 7 does not pass the inner, annular projection 174 by the action of the resilient means 4 (the restoring force of the compression coil 41), and that (b) the stop ring 7 passes the inner, annular projection 174 by a pulling force for confirming the connection of the flexible pipe 100. Specifically, each taper angle $\alpha_1$, $\alpha_2$ is preferably 40-50°, for example, such that good response (clicking) is sensed when an average worker conducts the above operations (a) and (b). Of course, each taper angle $\alpha_1$, $\alpha_2$ may be changed properly depending on the restoring force of the compression coil 41.

The depth $D_{171}$ of the first engaging groove 171 is preferably smaller than the diameter D of the stop ring 7, for example, about half of the diameter D. The length $La_1+Lb_1$ of the first engaging groove 171 is preferably substantially equal to the diameter D of the stop ring 7.

The depth $D_{172}$ of the second engaging groove 172 is preferably smaller than the diameter D of the stop ring 7, specifically 0.6-0.7 times the diameter D. The length $La_2+Lb_2$ of the second engaging groove 172 is preferably more than the diameter D of the stop ring, specifically 1.3-1.4 times.

For example, when the taper angle is $\alpha_1=\alpha_2=45°$, the length $La_2+Lb_2$ of the second engaging groove 172 is preferably within a range of 1.2-1.6 times the length $La_1+Lb_1$ of the first engaging groove 171, to obtain the smooth movement of the stop ring 7, and to retain the stop ring 7 surely in the first and second engaging grooves 171, 172.

The depth $D_{173}$ of the third engaging groove 173 is preferably more than the diameter D of the stop ring 7, specifically 1.1-1.2 times. The length $L_3$ of the third engaging groove 173 also is preferably larger than the diameter D of the stop ring 7, specifically 1.1-1.2 times. The peripheral, annular groove 32 in the pressing nut 3 preferably has larger depth $D_{32}$ than the diameter D of the stop ring 7 (specifically 1.1-1.2 times), and slightly larger length $L_{32}$ than the diameter D of the stop ring 7 (specifically 1.05-1.1 times).

(2) Connecting Operation (a) Assembling of Pipe Joint

To assemble the pipe joint such that it can be used soon at a piping site, the compression coil 41, the guide member 42 and the sliding member 43 are set in the joint body 2 using a jig as shown in FIG. 1; the first sealing member 5 comprising the gas-tight packing 51, to which the metal guide 52 is fixed, and the fire-resistant packing 53, and the retainer 6 are then inserted into the joint body 2; and finally the pressing nut 3, to which the second sealing member 8, the third sealing member 9 and the indicator ring 10 are mounted, are inserted into the joint body 2. In this case, the stop ring 7 is first received in the peripheral, annular groove 32 of the pressing nut 3 as shown in FIG. 5(a). Because the peripheral, annular groove 32 is deeper than the diameter D of the stop ring 7, the stop ring 7 is completely received in the peripheral, annular groove 32, so that the pressing nut 3 can slide in the joint body 2 without resistance. While the pressing nut 3 is entering, the peripheral, annular groove 32 is aligned with the second engaging groove 172, so that the stop ring 7 enters the second engaging groove 172 as shown in FIG. 5(b). The further sliding of the pressing nut 3 makes the stop ring 7 enter the first engaging groove 171 passing the inner, annular, triangular projection 174 as shown in FIG. 5(c). Because the depth $D_{171}$ of the first engaging groove 171 is smaller than the diameter D of the stop ring 7, the stop ring 7 engages both of the first engaging groove 171 and the peripheral, annular groove 32. In this state, a tip end of the pressing nut 3 abuts the retainer 6, making the pipe joint 1 usable.

(b) Insertion Operation of Flexible Pipe

Figure 7:
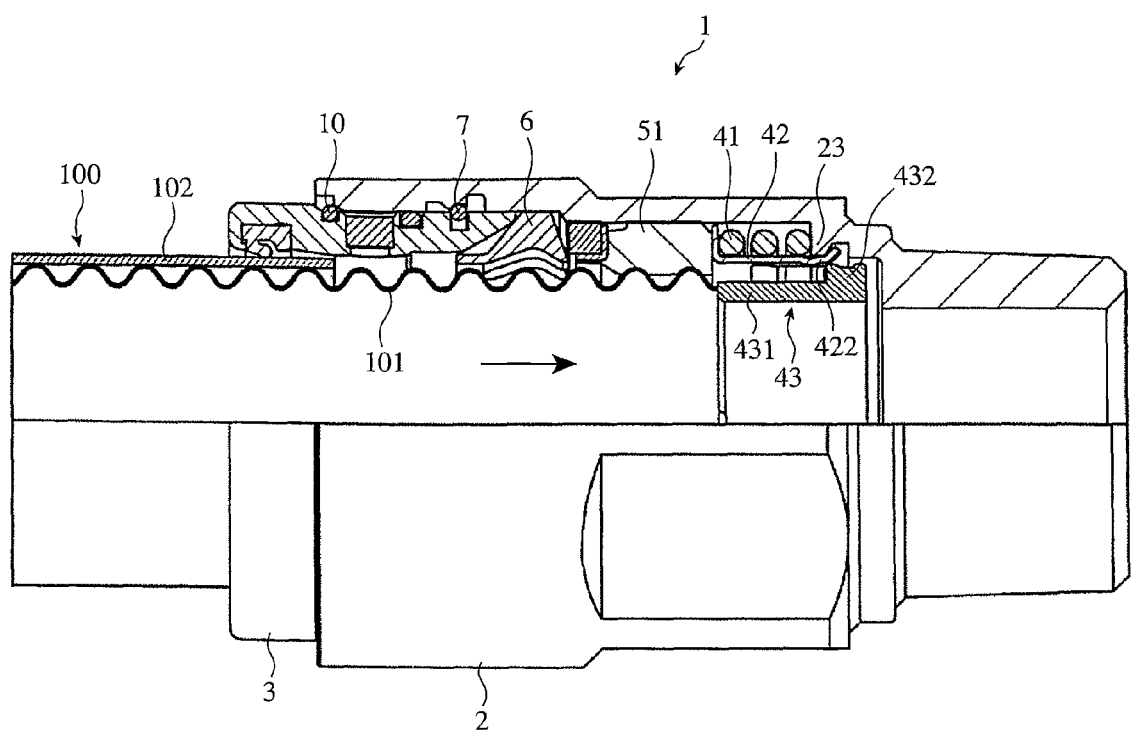
FIG. 7 is a partially cross-sectional side view showing a pipe joint in the first embodiment, into which a flexible pipe has been inserted until it abuts the sliding member.
Figure 8:
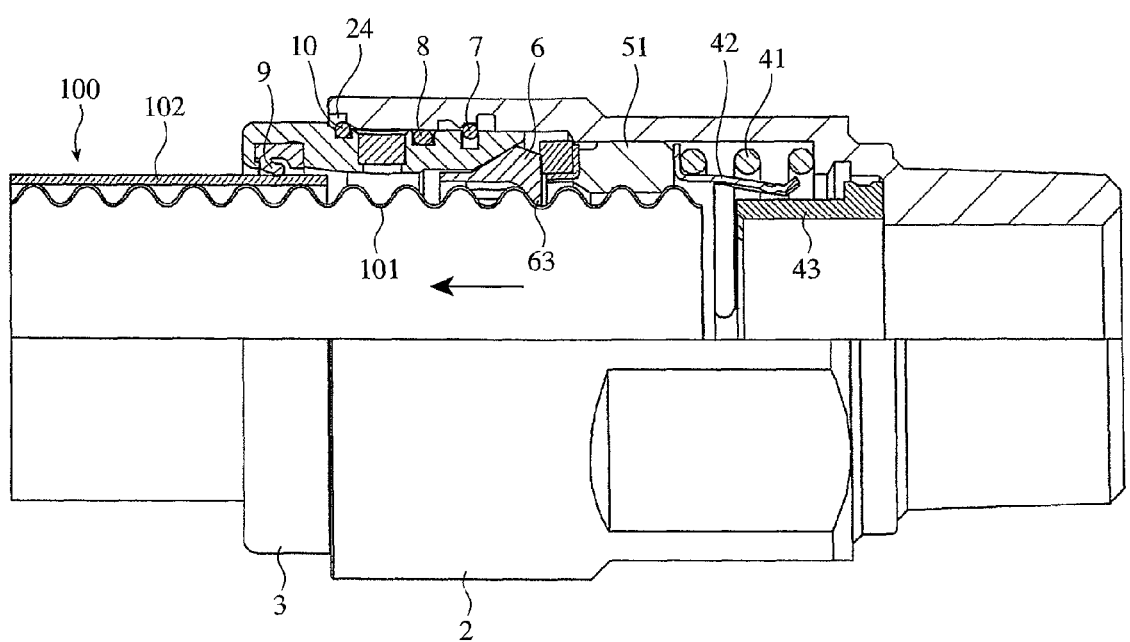
FIG. 8 is a partially cross-sectional side view showing a pipe joint in the first embodiment, to which a flexible pipe is completed connected.

When a flexible pipe 100, from which a resin coating 102 as long as several ridges is removed from the tip end portion, is inserted into the pipe joint 1, a tip end of the corrugated metal pipe 101 abuts the cylindrical portion 431 of the sliding member 43. With the pressing nut 3 pushed into the joint body 2, the flange 432 of the sliding member 43 detaches from the inner, annular projection 23 of the joint body 2 as shown in FIG. 7, liberating the arcuate plates 422 of the guide member 42 from gripping by the inner, annular projection 23 and the flange 432 of the sliding member 43. Thus, the restoring force of the compression coil 41 causes the guide member 42 to push the packing 51 of the first sealing member 5 as shown in FIG. 8. The retainer 6 pushed by the first sealing member 5 slides in the direction shown by the arrow in FIG. 8, so that it is pushed to the tapered tip end surface 31a of the pressing nut 3. When the tapered surfaces 62a of the segments 62 of the retainer 6 abut the tapered surface 31a of the pressing nut 3, the segments 62 are deformed inward, so that the tapered surfaces 62a of the segments 62 are closely adhered to the tapered surface 31a of the pressing nut 3, and that the nail portions 63 of the segments 62 engage the valleys of the corrugated metal pipe 101. As a result, the flexible pipe 100 is not detached from the pipe joint 1. During this insertion operation of the flexible pipe 100, there is a click sound because the compression coil 41 instantaneously expands to push the metal guide member 42. With this click sound, it can be confirmed that the flexible pipe 100 has been normally connected to the pipe joint 1.

When the compression coil 41 is released, the packing 51 longitudinally compressed by the restoring force of the compression coil 41 expands radially, providing improved sealing between the joint body 2 and the flexible pipe 100. Accordingly, even with some deformations (for example, flattening or bending) in the corrugated pipe 101, the flexible pipe 100 can provide gas-tight connection to the joint body 2. Also, the sealing member 8 ensures sealing between the joint body 2 and the pressing nut 3, and the sealing member 9 closely adhered to a peripheral surface of the flexible pipe 100 ensures sealing between the flexible pipe 100 and the pressing nut 3, thereby preventing the intrusion of rainwater.

(c) Connection Confirmation of Flexible Pipes

To confirm the normal connection of the flexible pipe 100 to the pipe joint 1 shown in FIG. 8, and to enable an operation manager to confirm such connection, the flexible pipe 100 is pulled from the pipe joint 1. Because the flexible pipe 100 is firmly connected to the pressing nut 3 with the rubber-made, gas-tight packing 51 and the nail portions 63 of the retainer 6, the pressing nut 3 is slightly pulled from the joint body 2 together with the flexible pipe 100, so that the indicator ring 10 appears from the annular groove 24 of the joint body 2 as shown in FIG. 9.

At this time, the stop ring 7 moves from the first engaging groove 171 to the second engaging groove 172 passing the inner, annular projection 174 as shown in FIG. 5(d), and held at a position engaging both of the second engaging groove 172 and the peripheral, annular groove 32. The length of the pressing nut 3 pulled is $La_2+Lb_2$. Further pulling the pressing nut 3 from this position fails to slide the pressing nut 3, because the stop ring 7 pushed by the peripheral, annular groove 32 abuts an inlet-side, vertical, inner wall of the second engaging groove 172. Pushing the pressing nut 3 into the joint body 2 does not easily slide the pressing nut 3 because of the resilient force of the compression coil 41. Thus, the relative movement of the pressing nut 3 to the joint body 2 is blocked, so that the flexible pipe 100 is not drawn from the pipe joint 1 even with a pulling force applied to the flexible pipe 100, making it possible to confirm that the insertion of the flexible pipe 100 (connection to the pipe joint 1) is completed.

Figure 9:
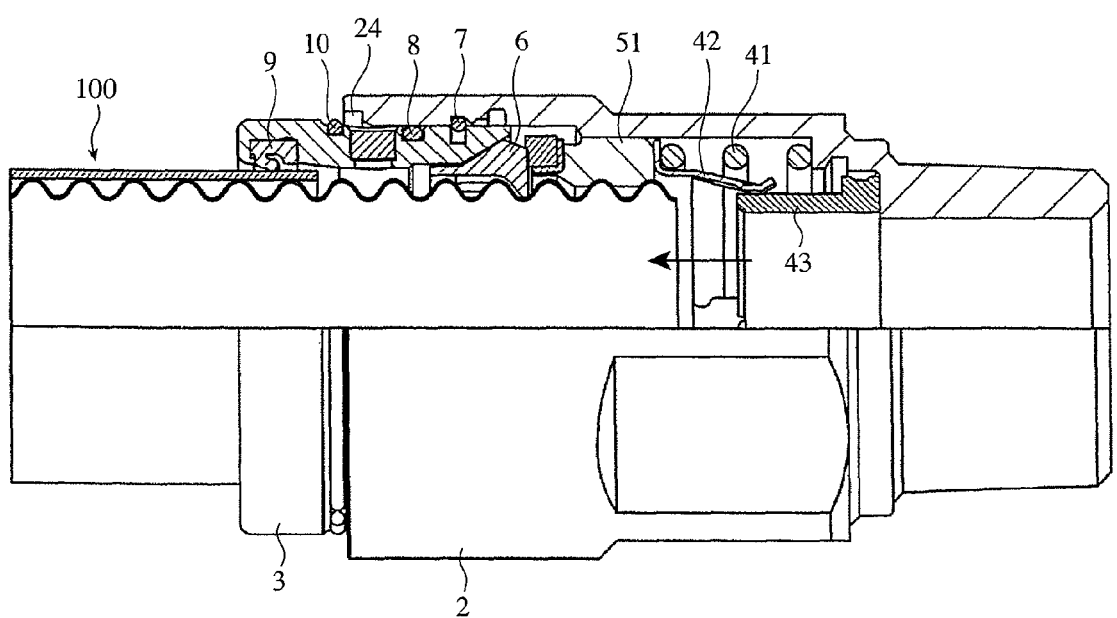
FIG. 9 is a partially cross-sectional side view showing a state where a flexible pipe is pulled to confirm the connection of the flexible pipe to the pipe joint in the first embodiment.

As shown in FIG. 9, with the indicator ring 10 appearing from the joint body 2, an operation manager can confirm by contact the completion of the connection of the flexible pipe even in a narrow, dark connecting site. Also, with at least a peripheral surface of the indicator ring 10 having different color from those of the joint body 2 and the pressing nut 3, the completion of the connection of the flexible pipe can be confirmed by the naked eye. Thus, the step of pulling the flexible pipe 100 after insertion makes it possible to surely confirm the completion of connecting the flexible pipe 100 to the pipe joint 1, and completely remove anxiety as to whether or not the connection operation has been conducted normally.

(d) Disassembling Operation of Pipe Joint

Figure 10:
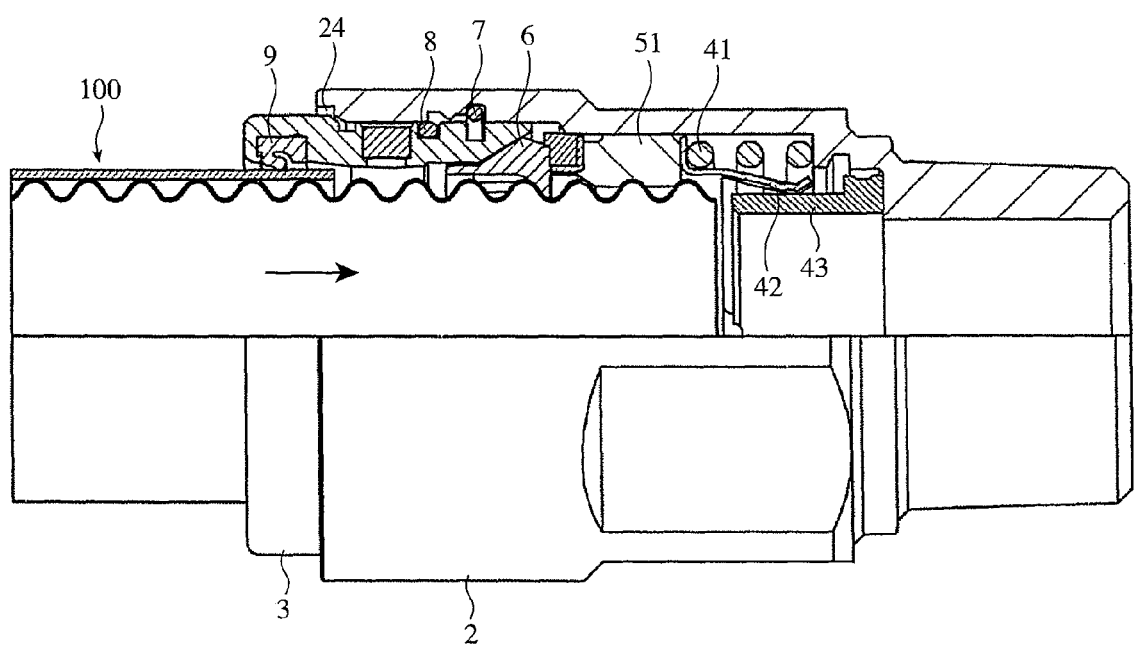
FIG. 10 is a partially cross-sectional side view showing a pipe joint in the first embodiment, which is prepared to a disassembling operation.

When the pressing nut 3 is pushed into the joint body 2 with the indicator ring 10 removed from the pressing nut 3 as shown in FIG. 10, the stop ring 7 moves from the second engaging groove 172 to the third engaging groove 173 passing the inner, annular projection 174 and the first engaging groove 171 as shown in FIG. 5(e). Because the third engaging groove 173 is deeper than the diameter D of the stop ring 7, the stop ring 7 is completely received in the third engaging groove 173, liberating the pressing nut 3 from connection with the joint body 2, and thus putting the pressing nut 3 in a state where it can be drawn from the joint body 2. As a result, the resilient means 4 comprising the compression coil 41, the guide member 42 and the sliding member 43, and the flexible pipe 100 provided with the sealing member 5, the retainer 6 and the pressing nut 3 can be removed from the joint body 2 as shown in FIG. 3, and the sealing member 5, the retainer 6 and the pressing nut 3 can be removed from the flexible pipe 100. By such disassembling operation, the flexible pipe 100 is detached without damage at all, enabling its reuse.

[2] Pipe Joint in Second Embodiment

This pipe joint has a structure enabling a single-action step of conducting the connection of the flexible pipe and confirming the normal connection of the flexible pipe. With the connection step and the connection-confirming step conducted simultaneously, the connection of the flexible pipe can be conducted quickly and easily even in a narrow, dark connecting site. An operation manager can confirm from the appearance of the pipe joint after connection whether or not a normal operation has been conducted. Because there is no need of additionally conducting a connection-confirming step, an operation of confirming the normal connection should not be forgotten.

(1) Structure

Figure 11:
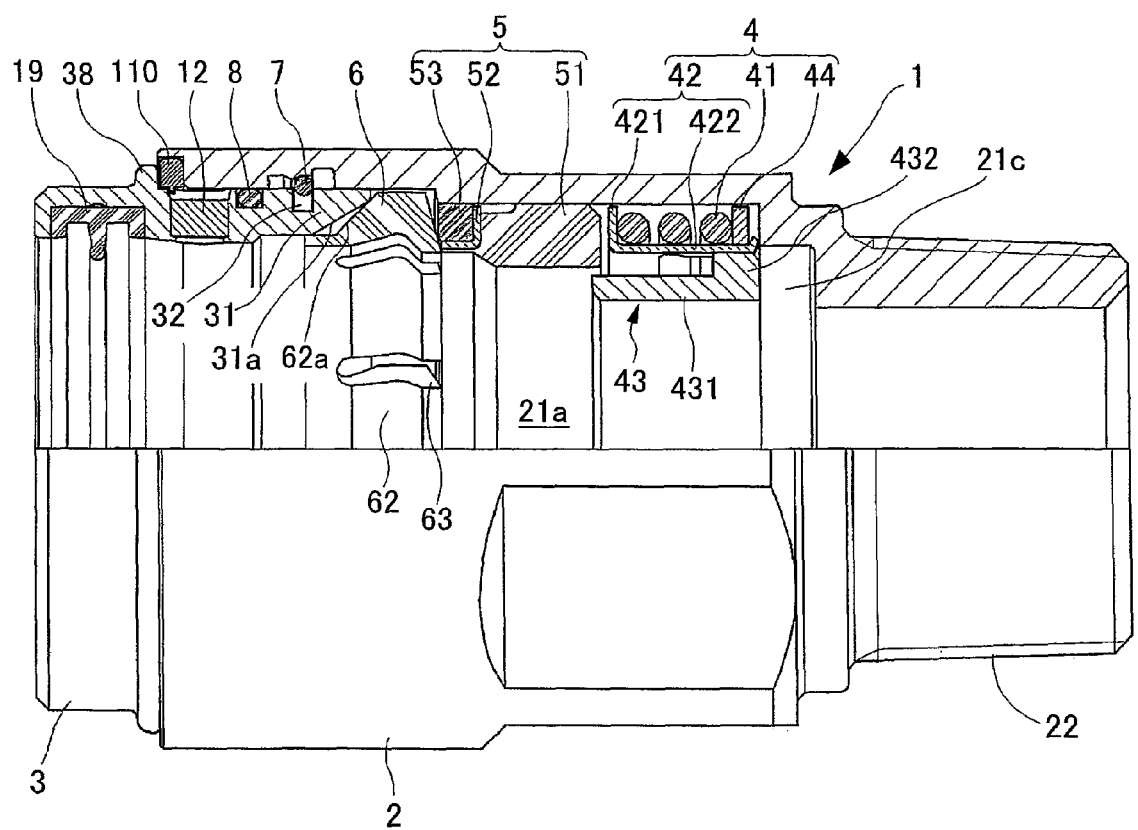
FIG. 11 is a partially cross-sectional side view showing a pipe joint according to the second embodiment.
Figure 12:
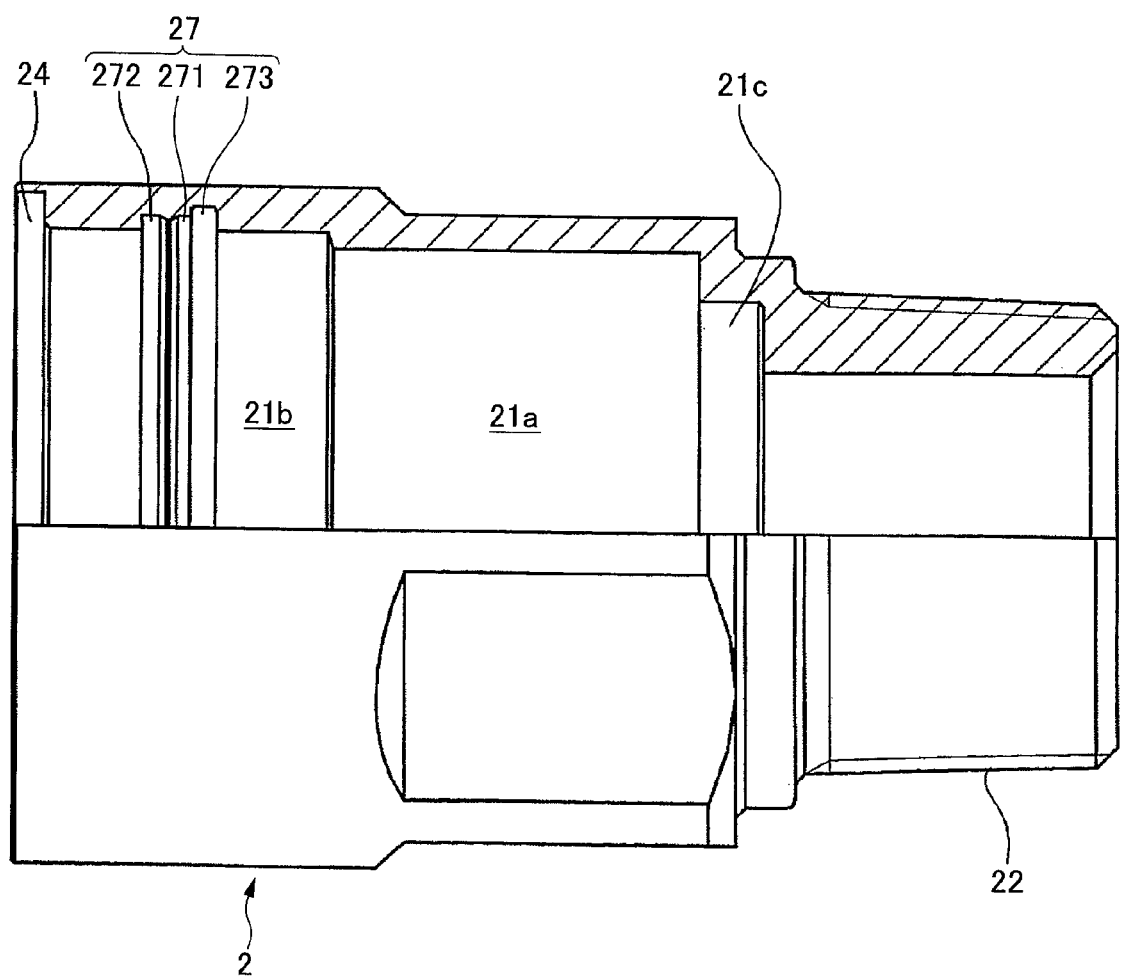
FIG. 12 is a partially cross-sectional side view showing a joint body in the pipe joint according to the second embodiment.

As shown in FIGS. 11 and 12, the pipe joint according to the second embodiment of the present invention is essentially the same as the pipe joint according to the first embodiment, except for the shapes of a joint body and a pressing nut, a resilient means, engaging grooves, an indicator ring and a third sealing member. Accordingly, explanation will be made on their differences below.

As shown in FIG. 12, the inner hole 21 of the joint body 2 has a third inner diameter portion 21c having a smaller inner diameter than that of the first inner diameter portion 21a on the deeper side of the first inner diameter portion 21a (on the side of the male screw portion 22). The third inner diameter portion 21c receives a sliding member 43 when a compression coil 41 is released.

Figure 13:
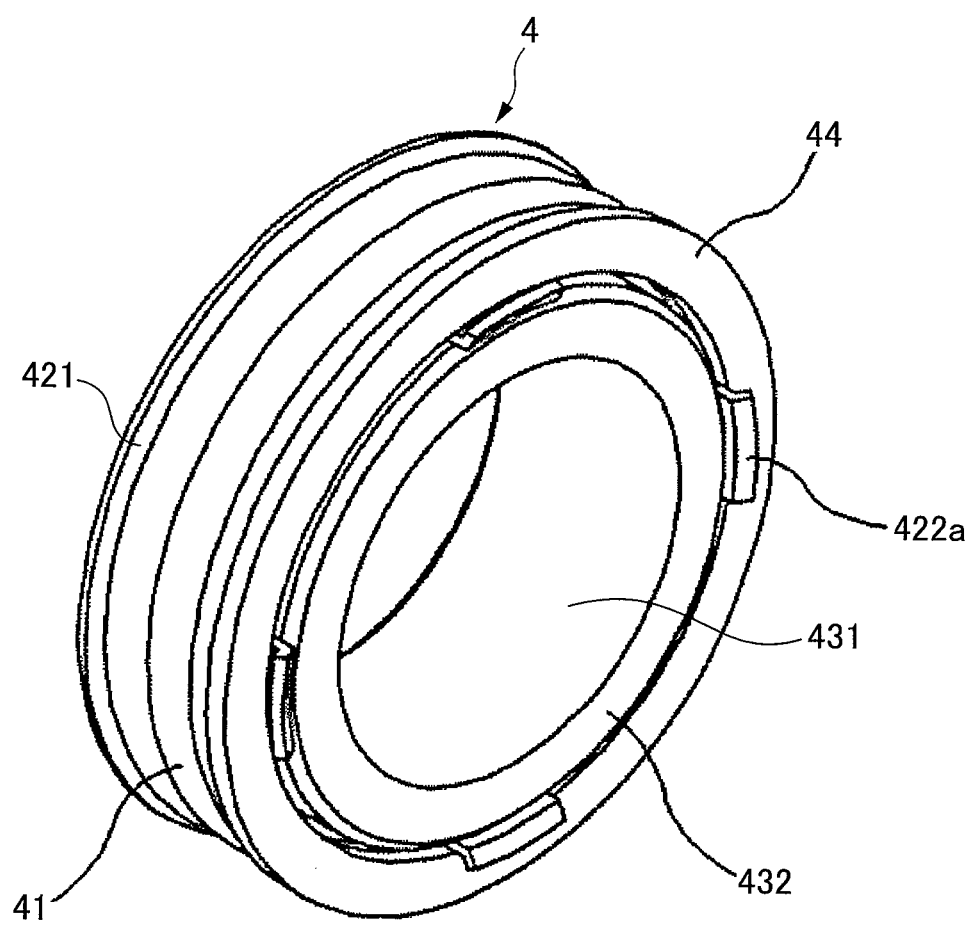
FIG. 13 is a perspective view showing an assembled resilient means in the second embodiment.

The resilient means 4 comprises a compression coil 41, an substantially cylindrical guide member 42 having an L-shaped cross section, a hollow, disc-shaped spacer member 44 supported by the guide member 42 together with the compression coil 41, and a substantially cylindrical sliding member 43 longitudinally movable inside the guide member 42. As shown in FIG. 13, the compression coil 41 and the guide member 42 are the same as in the first embodiment.

With the compression coil 41 sandwiched in a compressed state between the hollow, disc-shaped support portion 421 of the guide member 42 and the spacer member 44, the spacer member 44 engages bent portions 422a of the guide member 42, so that a flange 432 of the sliding member 43 supports inner surfaces of the bent portions 422a to prevent the bent portions 422a from opening, thereby keeping the compression coil 41 in a compressed state. Accordingly, the resilient means 4 is held inside the joint body 2 with its parts assembled. When the sliding member 43 slides toward the deeper side of the joint body 2, it is detached from the inner surfaces of the bent portions 422a. As a result, the arcuate plates 422 are bent inward to detach the spacer member 44 from the bent portions 422a, so that the compression coil 41 expands. From the aspect of strength, the spacer member 44 is preferably made of metals.

The third sealing member 19 is a lip packing having a T-shaped cross section; a lip inwardly extending from a longitudinal center thereof being bent to engage the flexible pipe 100 at a desired sealing surface pressure, thereby providing sealing between the pressing nut 3 and the flexible pipe 100.

Figure 14A:
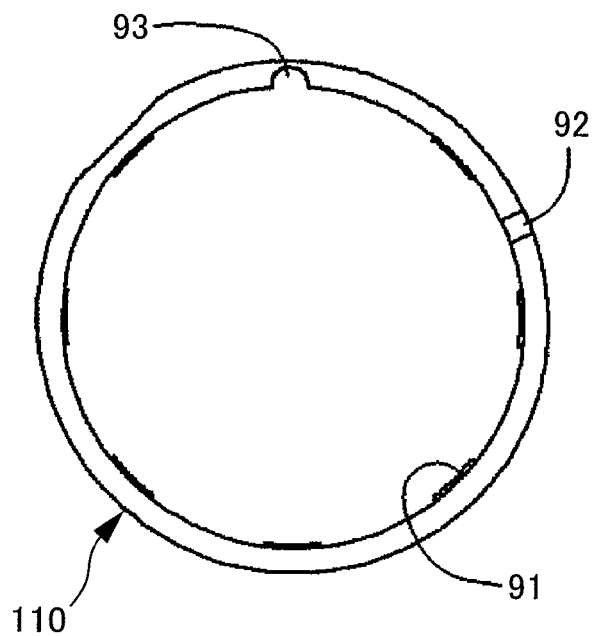
FIG. 14(a) is a front view showing an indicator ring used in the second embodiment.
Figure 14B:
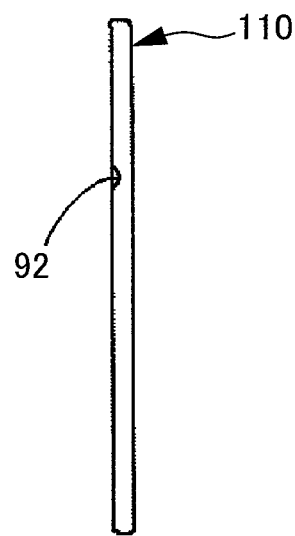
FIG. 14(b) is a side view showing an indicator ring used in the second embodiment.

To facilitate the disassembling operation of the pipe joint into which the flexible pipe is inserted, an indicator ring 110 made of engineering plastics is detachably mounted to a peripheral, annular groove of the pressing nut 3. As shown in FIG. 14, for easy mounting to and detaching from the pressing nut 3, the indicator ring 110 is provided on the inner surface with pluralities of projections 91 received in the peripheral, annular groove of the pressing nut 3. The indicator ring 110 has a recess 92 on an end surface, and an arcuate notch 93 on an inner surface. When the indicator ring 110 is pulled with a hook-shaped tool engaging the recess 92, the indicator ring 110 is broken at the notch 93, so that it can be drawn. Because the notch 93 makes the indicator ring 110 deformable by a small force, the indicator ring 110 can be easily mounted to a circumferential groove of the pressing nut 3. The projection 91 also facilitates mounting to the circumferential groove. To enable the connection confirmation action by the naked eye, the indicator ring 110 preferably has different color from those of the joint body 2 and the pressing nut 3. The pressing nut 3 has an annular rib 38 near the peripheral, annular groove for mounting the indicator ring 110.

(2) Engaging Mechanism

Figure 18:
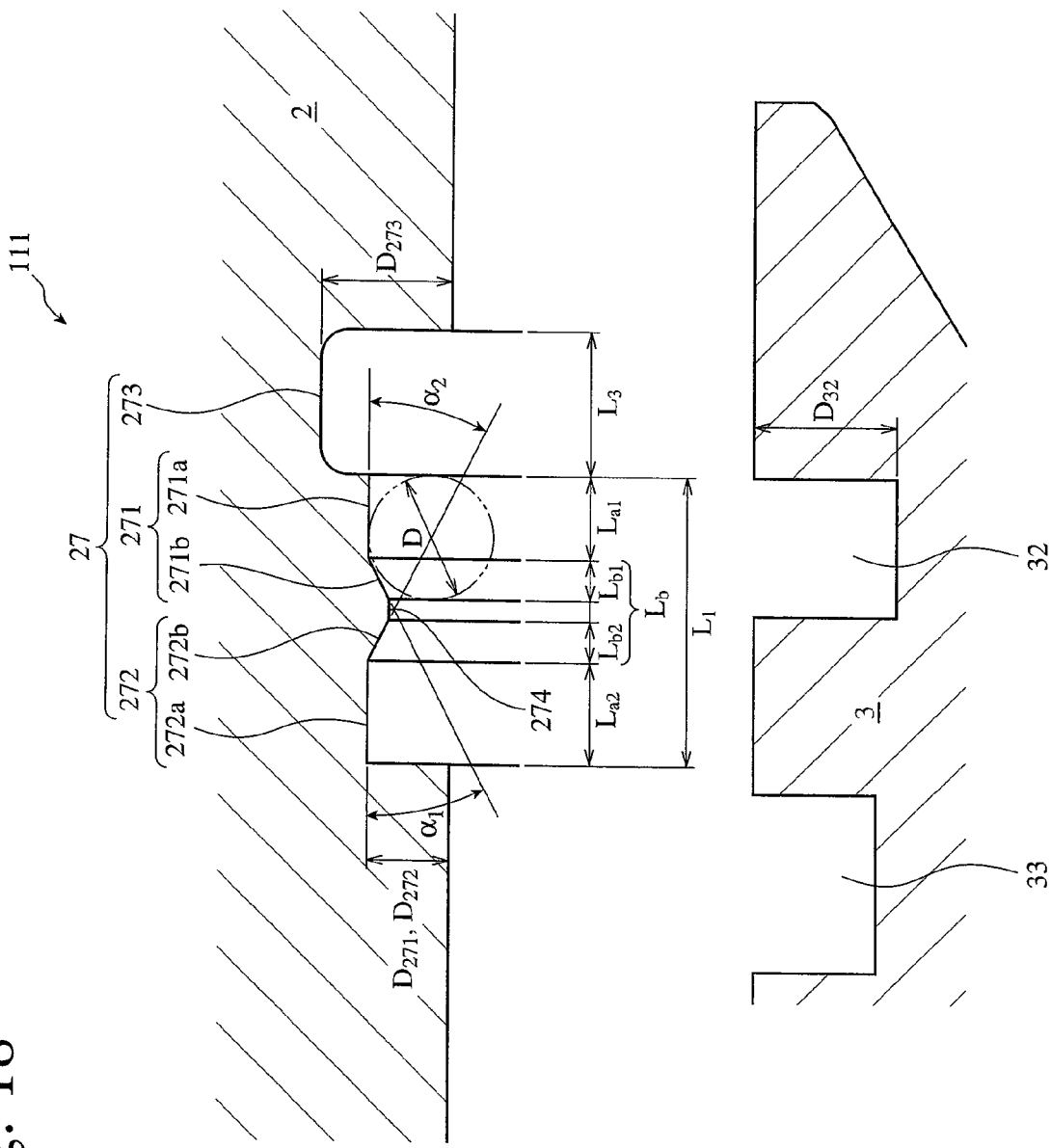
FIG. 18 is a cross-sectional view showing the shapes and sizes of first to third engaging grooves in the joint body, and peripheral, annular grooves in the pressing nut in the second embodiment.

As shown in FIGS. 17 and 18, the engaging mechanism 111 comprises an engaging groove assembly 27 comprising first to third engaging grooves 271, 272, 273 provided on the inner surface of the joint body 2 and communicating with each other, and a peripheral, annular groove 32 of the pressing nut 3. As shown in FIG. 18, the first engaging groove 271 comprises an annular groove 271a (longitudinal length: $La_1$), and a tapered groove 271b (longitudinal length: $Lb_1$, taper angle: $\alpha_1$) having a tapered surface having a decreasing diameter from the inner surface of the annular groove 271a toward the inlet side (on the left side in FIG. 18). The second engaging groove 272 communicating with the tapered groove 271b of the first engaging groove 271 comprises a tapered groove 272b (length: $Lb_2$, taper angle: $\alpha_2$) having a tapered surface expanding toward the inlet side, and an annular groove 272a (longitudinal length: $La_2$) having an inner surface connected to the tapered groove 272b. An inner, annular projection 274 (length: Lb) having a trapezoidal cross section is formed by the tapered groove 271b of the first engaging groove 271 and the tapered groove 272b of the second engaging groove 272. The third engaging groove 273 (longitudinal length: $L_3$) is communicating with the annular groove 271a of the first engaging groove 271.

In order that the stop ring 7 smoothly moves from the first engaging groove 271 to the second engaging groove 272 by the insertion operation of the flexible pipe 100, the total length $L_1$ of the first engaging groove 271 and the second engaging groove 272 is more than 2 times the diameter D of the stop ring 7.

Because the first and second engaging grooves 271, 272 are communicating with each other via the inner, annular projection 274 having a trapezoidal cross section, the application of a force of making the diameter of the stop ring 7 smaller than the inner diameter of the inner, annular projection 274 to the pressing nut 3 can move the stop ring 7 either from the first engaging groove 271 to the second engaging groove 272, or from the second engaging groove 272 to the first engaging groove 271. However, with a smaller force than reducing the diameter of the stop ring, the inner, annular projection 274 prevents the stop ring 7 received in the first engaging groove 271 from moving to the second engaging groove 272.

Though the taper angles $\alpha_1$ and $\alpha_2$ are the same in FIG. 18, they may be different. Too large taper angles $\alpha_1$, $\alpha_2$ make the movement of the stop ring 7 difficult, and too small taper angles $\alpha_1$, $\alpha_2$ make it difficult to retain the stop ring 7 in the first or second engaging groove 271, 272.

In the second embodiment, the side surfaces of the inner, annular projection 274 should have such inclination angles (taper angles) $\alpha_1$, $\alpha_2$ that (a) before the connection of the flexible pipe 100, the stop ring 7 is retained in the first engaging groove 271, and that (b) when the flexible pipe 100 is connected, the stop ring 7 moves from the first engaging groove 271 to the second engaging groove 272 passing the inner, annular projection 274. In other words, each taper angle $\alpha_1$, $\alpha_2$ should be relatively small, such that the stop ring 7 passes the inner, annular projection 274 by the action of the resilient means 4 (by the restoring force of the compression coil 41). Specifically, each taper angle $\alpha_1$, $\alpha_2$ is preferably, for example, 20-30°, such that good response (clicking) can be sensed when an average worker conducts the above connection operation. Of course, each taper angle $\alpha_1$, $\alpha_2$ may be properly changed depending on the restoring force of the compression coil 41.

The depth $D_{271}$ of the first engaging groove 271 is preferably smaller than the diameter D of the stop ring 7, for example, about half of the diameter D. The length $La_1+Lb_1$ of the first engaging groove 271 is preferably almost equal to the diameter D of the stop ring 7.

The depth $D_{272}$ of the second engaging groove 272 may be the same as the depth $D_{271}$ of the first engaging groove 271. The length $La_2+Lb_2$ of the second engaging groove 272 is preferably more than the diameter D of the stop ring, specifically 1.1-1.2 times.

For example, when the taper angles are $\alpha_1=\alpha_2=25°$, the length $La_2+Lb_2$ of the second engaging groove 272 is preferably within a range of 1.1-1.2 times the length $La_1+Lb_1$ of the first engaging groove 271, to ensure the smooth movement of the stop ring 7, and to surely hold the stop ring 7 in either one of the first and second engaging grooves 271, 272.

The depth $D_{273}$ and length $L_2$ of the third engaging groove 273, and the depth $D_{32}$ and length $L_{32}$ of the peripheral, annular groove 32 of the pressing nut 3 may be the same as in the first embodiment.

(3) Connection Operation

Figure 15:
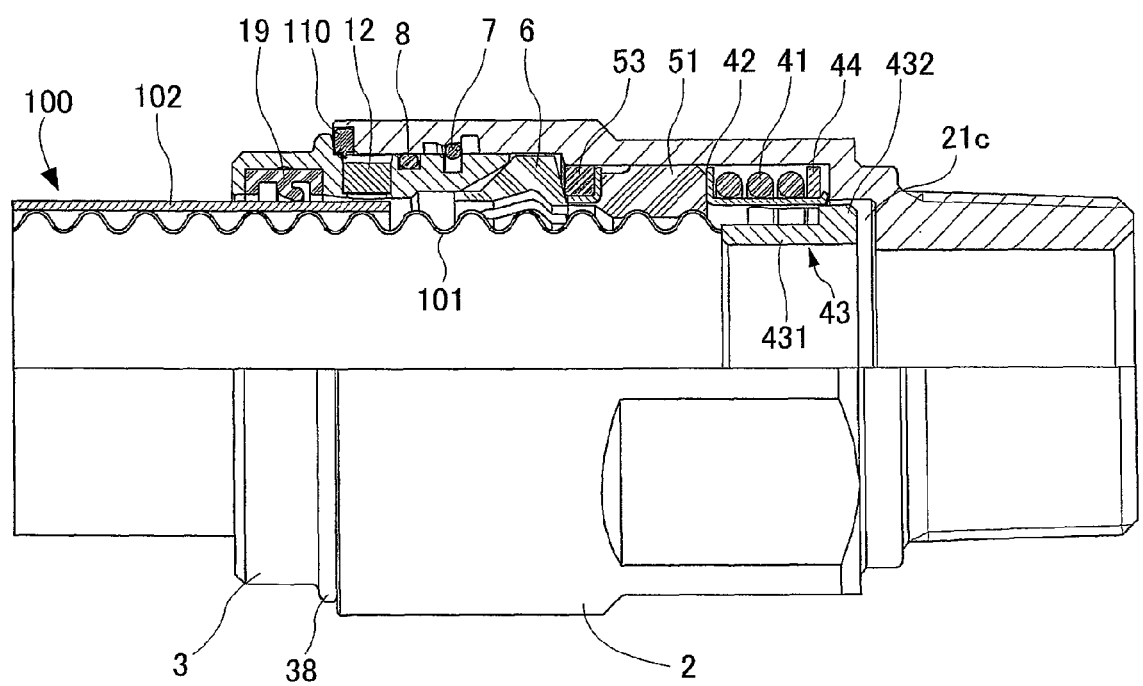
FIG. 15 is a partially cross-sectional side view showing a pipe joint in the second embodiment, into which a flexible pipe has been inserted until it abuts the sliding member.

When a flexible pipe 100 with a coating resin 102 as long as several ridges removed from the tip end portion is inserted into a pipe joint 1 in the state shown in FIG. 11, a tip end of the corrugated metal pipe 101 of the flexible pipe 100 abuts the sliding member 43 as shown in FIG. 15. At this time, the stop ring 7 passes the states shown in FIGS. 17(a) and 17(b) to reach the state shown in FIG. 17(c), so that it is held by both of the first engaging groove 271 and the peripheral, annular groove 32.

Figure 16:
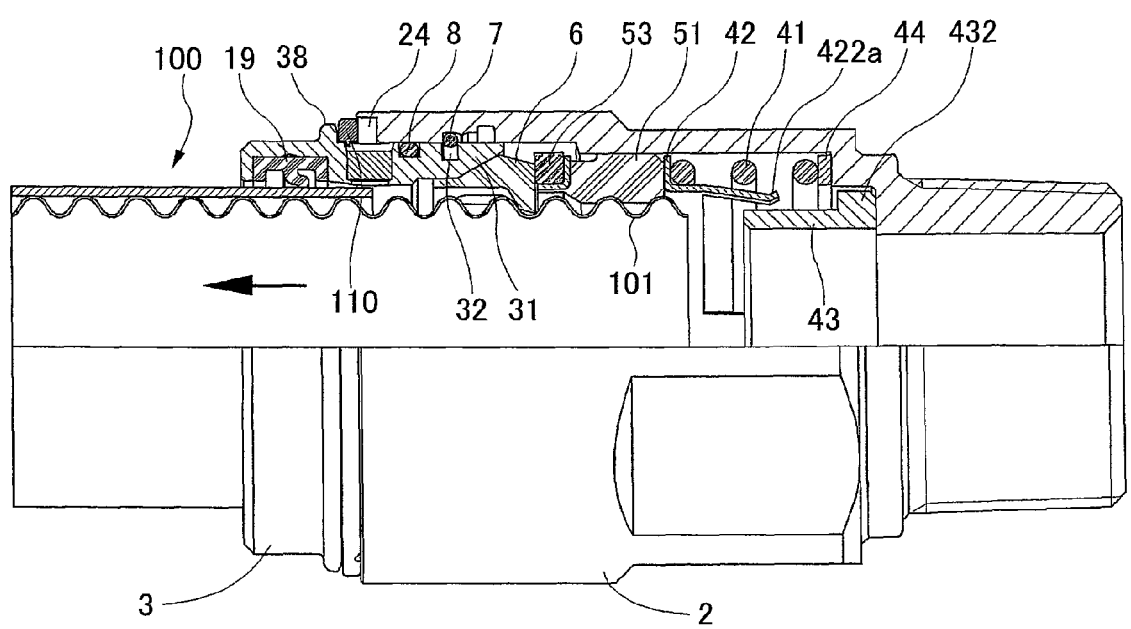
FIG. 16 is a partially cross-sectional side view showing a pipe joint in the second embodiment, in a state where the connection of a flexible pipe is completed.
Figure 17A:
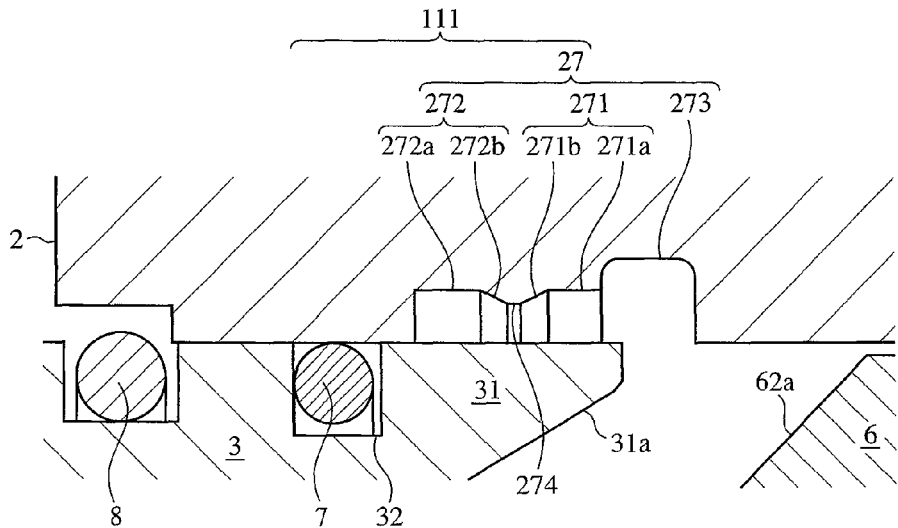
FIG. 17(a) is a cross-sectional view showing the positional relation between a stop ring and engaging grooves when the pressing nut starts to enter the joint body in the second embodiment.
Figure 17B:
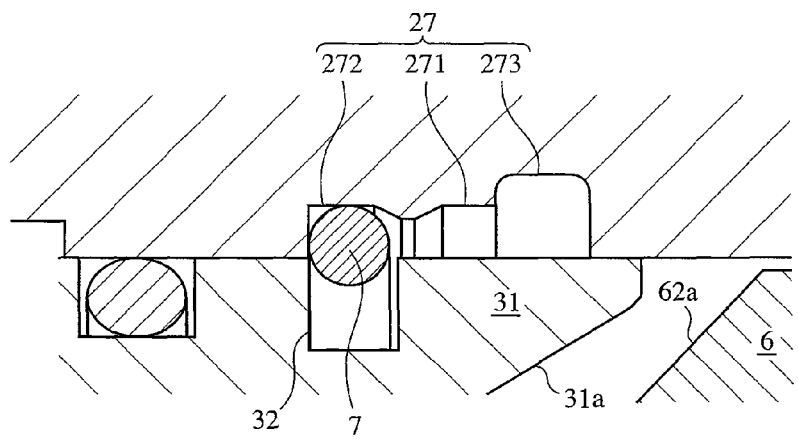
FIG. 17(b) is a cross-sectional view showing the positional relation between a stop ring and engaging grooves while the pressing nut is being inserted into the joint body in the second embodiment.
Figure 17C:
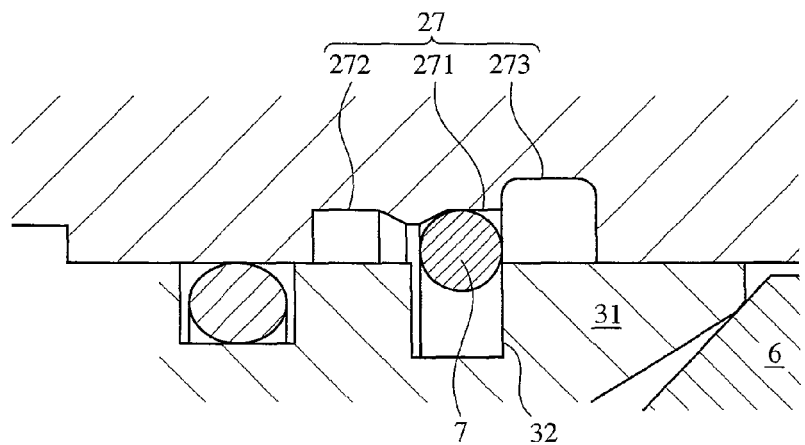
FIG. 17(c) is a cross-sectional view showing the positional relation between a stop ring and engaging grooves when the pressing nut has been inserted into the joint body until it abuts the retainer in the second embodiment.
Figure 17D:
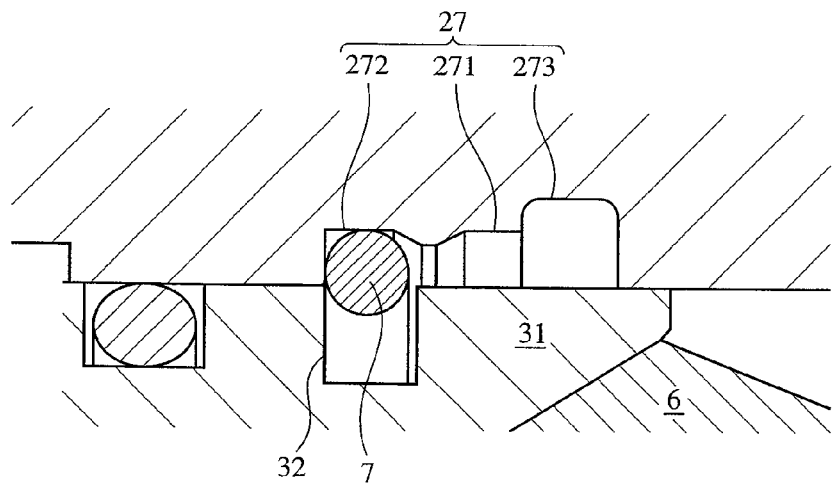
FIG. 17(d) is a cross-sectional view showing the positional relation between a stop ring and engaging grooves after the flexible pipe is connected in the second embodiment.
Figure 17E:
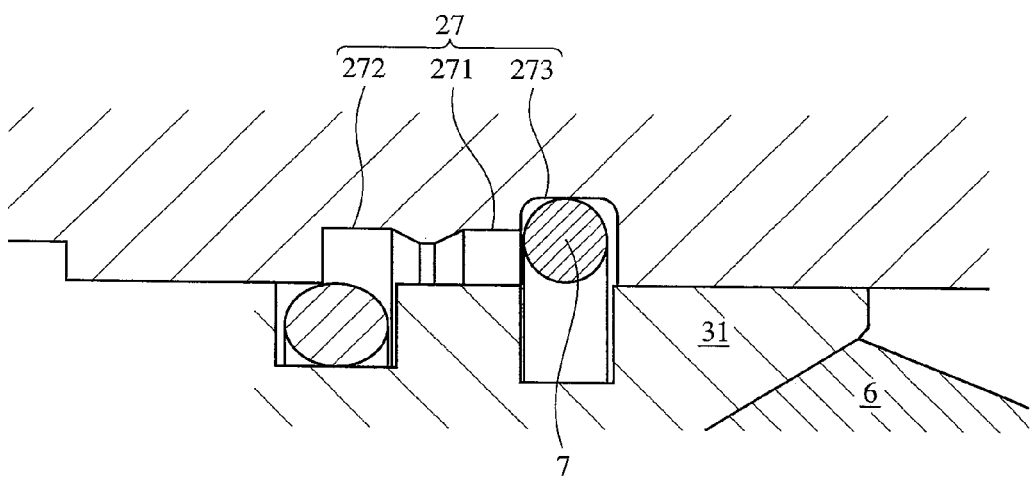
FIG. 17(e) is a cross-sectional view showing the positional relation between a stop ring and engaging grooves when the pipe joint is disassembled in the second embodiment.

When the flexible pipe 100 is further pushed into the joint body 2, the flange 432 of the sliding member 43 is detached from engagement with the spacer member 44 as shown in FIG. 16, entering the third inner diameter portion 21c. As a result, the guide member 42 pushes the packing 51 of the first sealing member 5 by the restoring force of the compression coil 41. The retainer 6 pushed by the first sealing member 5 slides toward the inlet side, and is pushed to the tapered tip end surface 31a of the pressing nut 3. With the tapered surfaces 62a of the segments 62 of the retainer 6 abutting the tapered surface 31a of the pressing nut 3, the segments 62 are deformed inward, so that the tapered surfaces 62a of the segments 62 are closely adhered to the tapered surface 31a of the pressing nut 3, and that the nail portions 63 of the segments 62 engage the valleys of the corrugated metal pipe 101. As a result, the flexible pipe 100 is put in a state not detachable from the pipe joint 1. Because the compression coil 41 expands instantaneously to push the metal guide member 42 in this insertion operation of the flexible pipe 100, there is a click sound. This click sound ensures the confirmation that the flexible pipe 100 has been normally connected to the pipe joint 1.

In the second embodiment, the stop ring 7 moves to the second engaging groove 272 by the release of the compression coil 41 as shown in FIG. 16. Namely, in the connection step of the flexible pipe 100, the stop ring 7 moves from the state shown in FIG. 17(c) to the state shown in FIG. 17(d), so that it is held by both of the second engaging groove 272 and the peripheral, annular groove 32, and that the pressing nut 3 is exposed from the joint body 2 by the distance ($La_2+Lb-Lb_1$) of the stop ring 7 moving from the first engaging groove 271 to the second engaging groove 272. Because the inner surface of the indicator ring 110 is provided with pluralities of projections 91 fitting in the peripheral, annular groove of the pressing nut 3, the indicator ring 110 is also exposed from the inlet-side annular groove of the joint body 2. With the relative movement of the joint body 2 to the pressing nut 3 blocked by the stop ring 7, the application of a force of pulling the flexible pipe 100 does not draw the pressing nut 3 and the flexible pipe 100 from the pipe joint 1. This state, in which the connection of the flexible pipe 100 to the pipe joint 1 is completed, can be confirmed by the exposed indicator ring 110. With the indicator ring 110, a worker can confirm by contact the completion of the connection of flexible pipe even in a narrow, dark connecting site. With at least a peripheral surface of the indicator ring 110 having different color from those of the joint body 2 and the pressing nut 3, the completion of the connection of flexible pipe can be confirmed by the naked eye.

Figure 19:
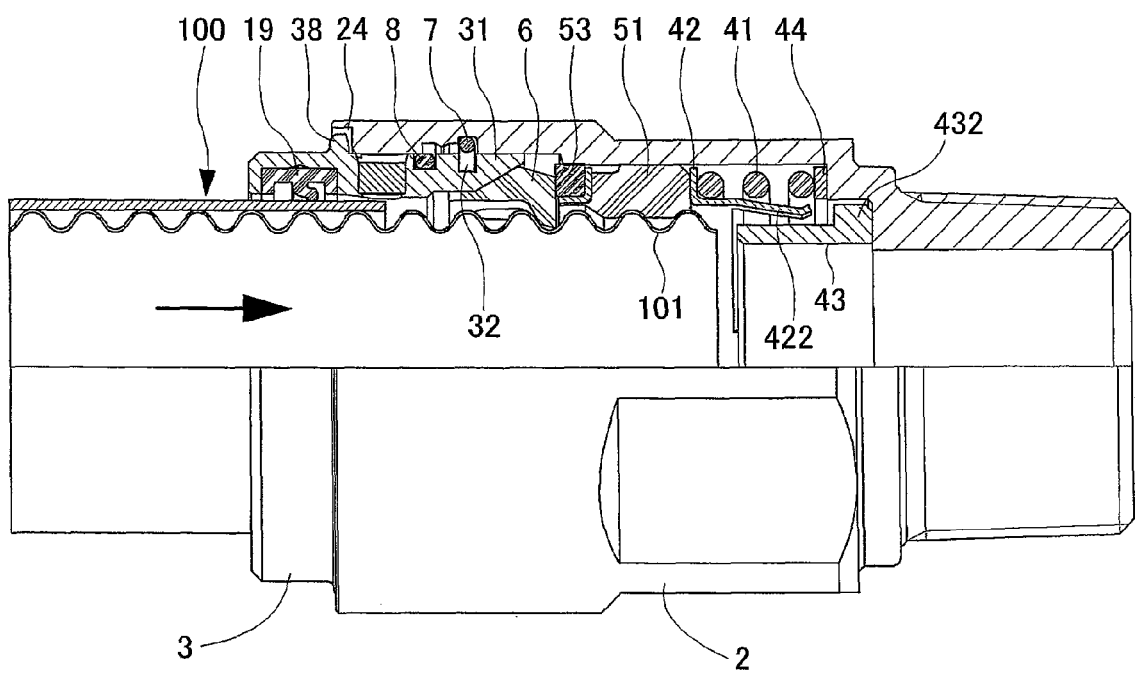
FIG. 19 is a partially cross-sectional side view showing a pipe joint in the second embodiment, which is prepared to a disassembling operation.
Figure 20:
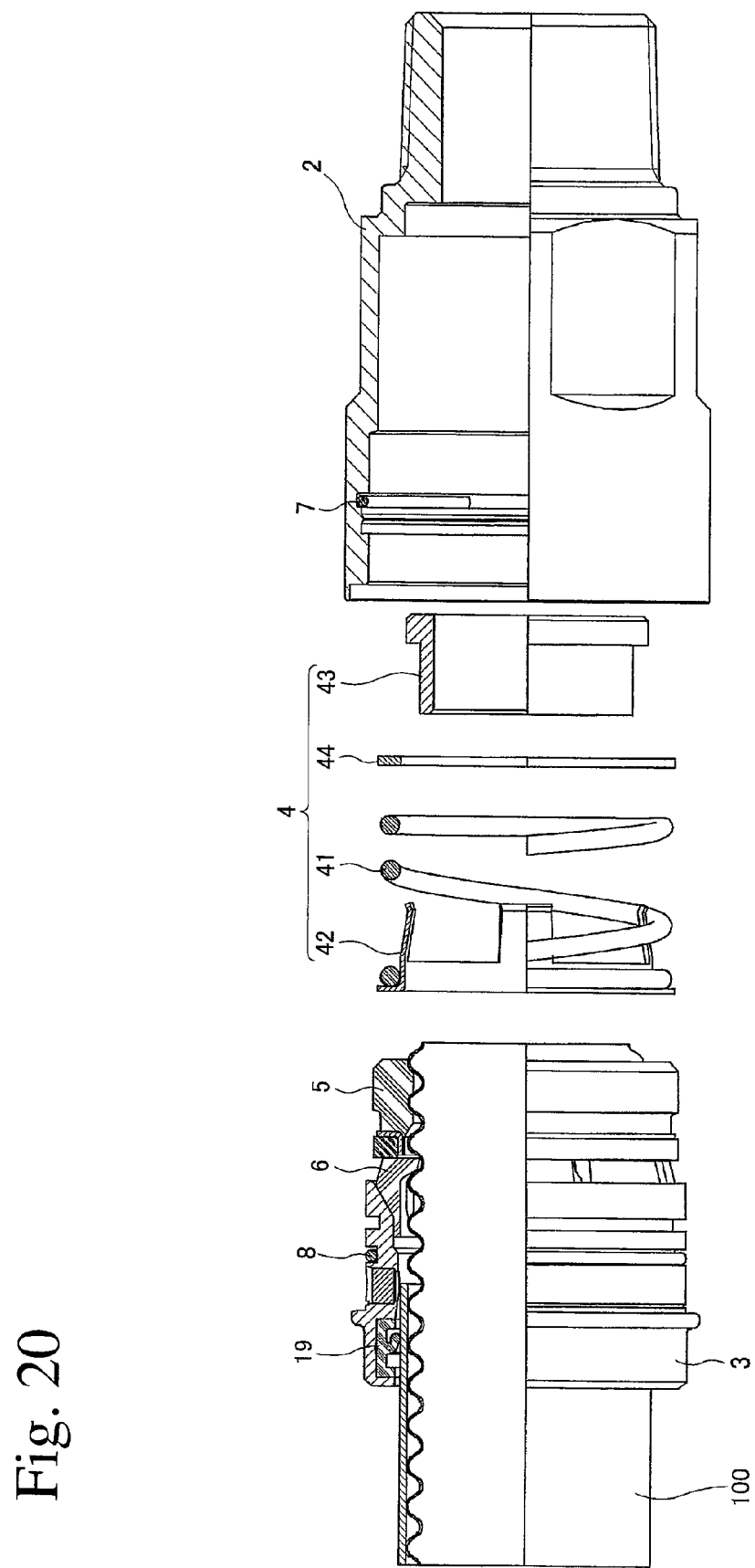
FIG. 20 is a partially cross-sectional side view showing a pipe joint in the second embodiment, which has been disassembled.

When the flexible pipe 100 is pushed into the joint body 2 as shown in FIG. 19 with the indicator ring 110 removed from the pipe joint shown in FIG. 16, the rib 38 of the pressing nut 3 enters the annular groove 24 of the joint body 2, and the stop ring 7 moves from the second engaging groove 272 to the third engaging groove 273 passing the inner, annular projection 274 and the first engaging groove 271. Because the third engaging groove 273 is deeper than the diameter D of the stop ring 7, the stop ring 7 is completely received in the third engaging groove 273, releasing the connection of the joint body 2 and the pressing nut 3. Accordingly, when the pressing nut 3 is drawn from the joint body 2, the flexible pipe 100 to which the sealing member 5, the retainer 6 and the pressing nut 3 are mounted, and the resilient means 4 comprising the compression coil 41, the guide member 42, the spacer member 44 and the sliding member 43 can be removed from the joint body 2 as shown in FIG. 20, and the sealing member 5, the retainer 6 and the pressing nut 3 can be removed from the flexible pipe 100. By such disassembling operation, the flexible pipe 100 can be removed without damage at all, and thus reused.

[3] Pipe Joint in Third Embodiment

Figure 21:
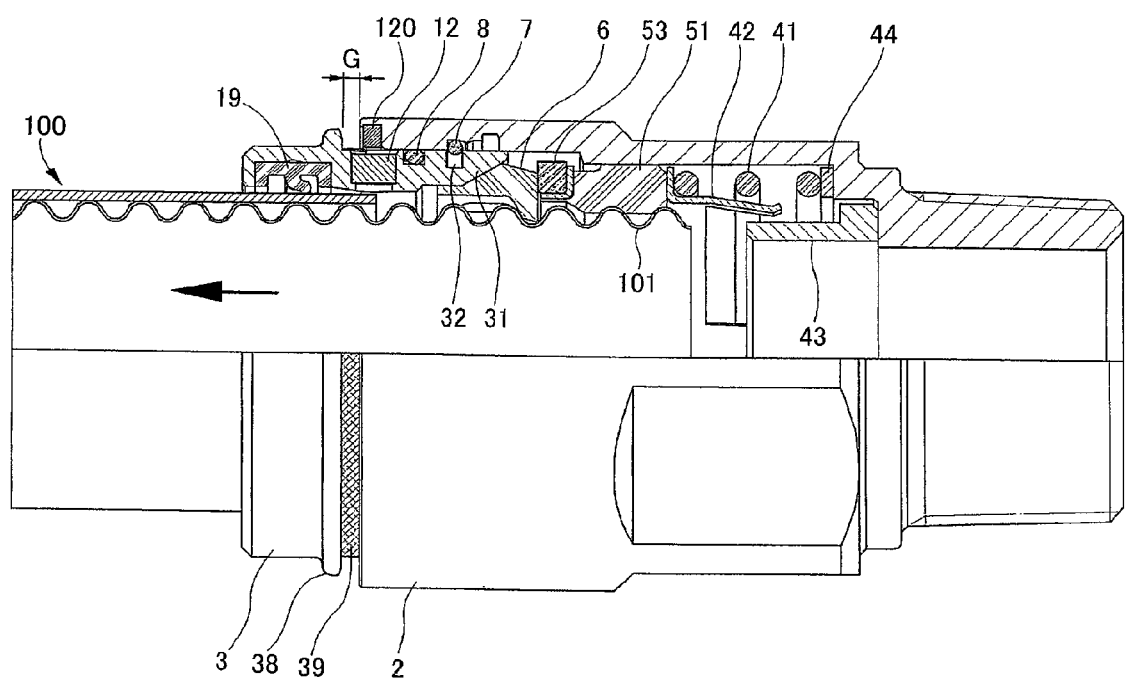
FIG. 21 is a partially cross-sectional side view showing a pipe joint in the third embodiment, in which the connection of a flexible pipe is completed.

The pipe joint according to the third embodiment differs from the pipe joint according to the second embodiment, in that a colored circular layer 39 as wide as a disassembling ring 120 is formed as an indicator on the deeper side of the annular rib 38 of the pressing nut 3, as shown in FIG. 21. Accordingly, only different portions from those in the second embodiment will be explained here.

The colored layer 39 having different color from those of the joint body 2 and the pressing nut 3 is formed by painting, etc. Because the disassembling ring 120 detachably attached to the joint body 2 is a compressed C-type ring, it is retained in the annular groove 24 of the joint body 2 even when the pressing nut 3 is exposed from the joint body 2 by the width G by the release of the compression coil 41. Thus, the colored circular layer 39 appears from the joint body 2.

Figure 22A:
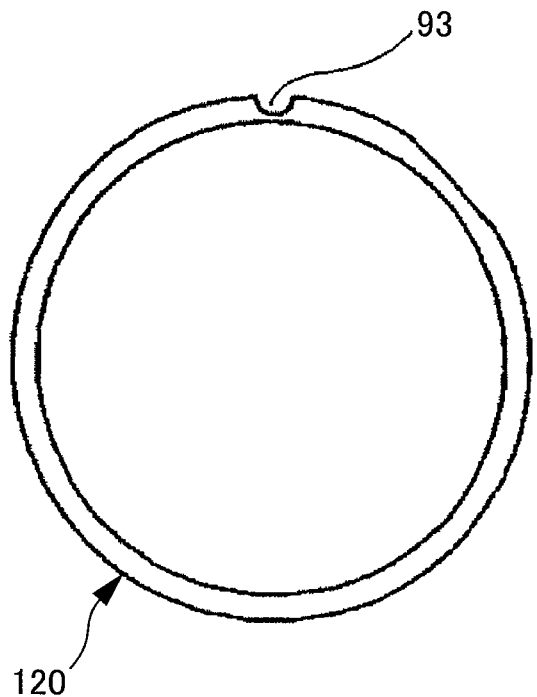
FIG. 22(a) is a front view showing a dissembling ring used in the third embodiment.
Figure 22B:
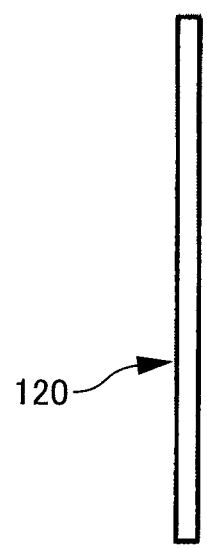
FIG. 22(b) is a side view showing a disassembling ring used in the third embodiment.
Figure 23:
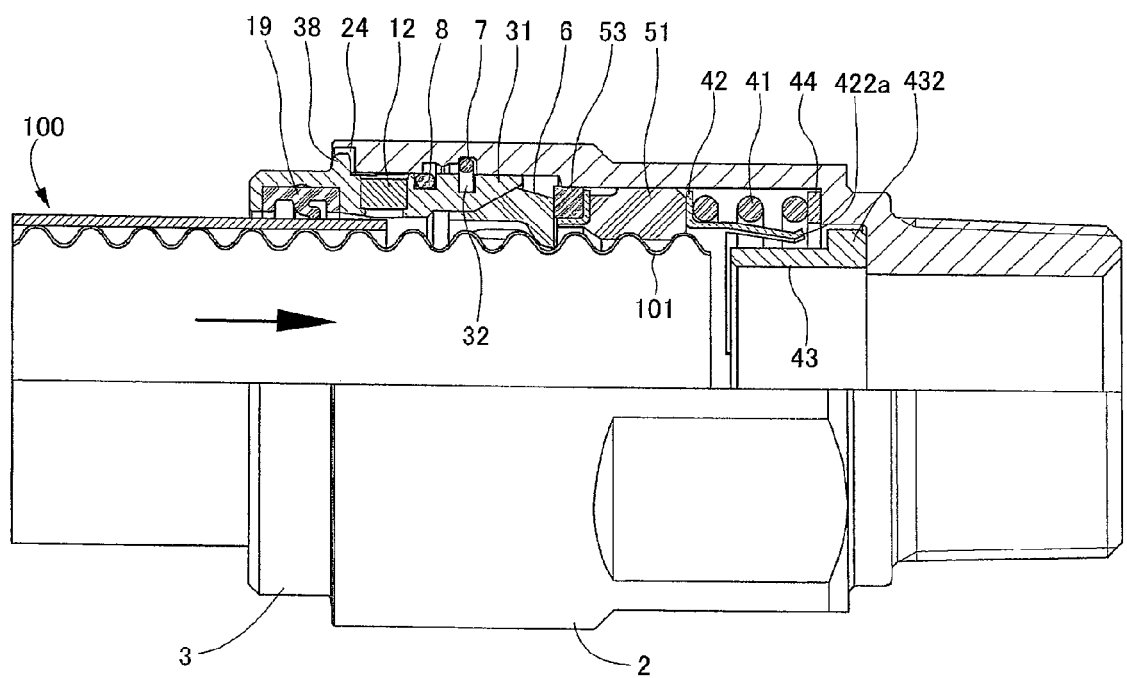
FIG. 23 is a partially cross-sectional side view showing a pipe joint in the third embodiment, which is prepared to a disassembling operation.

As shown in FIG. 22, the disassembling ring 120 has a notch 93 on the peripheral surface, for easy attachment to and detachment from the joint body 2. To remove the disassembling ring 120, as in the case of the indicator ring shown in FIG. 14, the disassembling ring 120 is drawn with a hook-shaped tool, to break it at the notch 93. Easily deformed by the notch 93, the disassembling ring 120 is easily attached to the joint body 2. This disassembling ring 120 differs from the indicator ring 110 shown in FIG. 14, in that it does not have projections on the inner surface, and that it is not colored for confirmation with the naked eye. When the pressing nut 3, into which the flexible pipe 100 is inserted, is pushed into the joint body 2 with the disassembling ring 120 removed, the stop ring 7 enters the third engaging groove 273 of the joint body 2, putting the pressing nut 3 in a state where it can be drawn from the joint body 2, as shown in FIG. 23.

Although the pipe joints of the present invention have been explained in detail above referring to the attached drawings, the pipe joints of the present invention are not restricted thereto but may be modified variously within the scope of the present invention. For example, the joint body is not restricted to a single-screw socket, but those having two sockets, elbows, tees or female screws may be used.

Effect of the Invention

The first pipe joint of the present invention has an engaging mechanism comprising a stop ring, an annular groove formed on an outer surface of the pressing nut for receiving the stop ring, and pluralities of engaging grooves formed on an inner surface of the joint body for receiving the stop ring and communicating with each other, the stop ring engaging both of the annular groove and the first engaging groove until the connection of the pipe is completed, and when the pipe is pulled after completing the connection, the stop ring moves from the first engaging groove to the second engaging groove on the inlet side thereof, so that the pressing nut is drawn from the joint body. Thus, the connection operation of the pipe and the confirmation operation of the normal connection of the pipe can be conducted by two steps. Accordingly, an operation manager can surely confirm from the appearance of the pipe joint after connection whether or not a normal operation has been conducted. Particularly even in a narrow, dark connecting site, an operation manager can confirm the connection operation easily and surely. Further, because the indicator ring does not appear without the connection-confirming operation, the connection-confirming operation is never forgotten.

The second pipe joint of the present invention has an engaging mechanism comprising a stop ring, an annular groove formed on an outer surface of the pressing nut for receiving the stop ring, and pluralities of engaging grooves formed on an inner surface of the joint body for receiving the stop ring and communicating with each other, the stop ring engaging both of the annular groove and the first engaging groove until the resilient means is pushed by a tip end of the pipe to expand, and when the pipe is connected to the pipe joint by the expansion of the resilient means, the stop ring moves from the first engaging groove to the second engaging groove on the inlet side thereof, so that it is held by both of the annular groove and the second engaging groove. Thus, the connection operation of the pipe and the confirmation operation of the normal connection of the pipe can be conducted by one step. Accordingly, an operation manager can easily confirm the connection, and also confirm from the appearance of the pipe joint after connection whether or not a normal operation has been conducted.

With the indicator ring detachably attached to the pressing nut, mere observation of the indicator ring by the naked eye surely enables a worker to confirm the normal connection of the pipe. With the indicator ring having a ring-disassembling function, the disassembling of the pipe joint can be easily conducted simply by pushing the pressing nut to the joint body after the indicator ring is removed. As a result, the pipe is removed from the pipe joint without damage, and thus reusable as it is.

What is claimed is:

1. A pipe joint comprising a pressing nut into which a pipe is inserted, a joint body into which said pressing nut is partially inserted, a sealing member for sealing said pipe and said joint body, a retainer engaging said pipe to prevent said pipe from being attached, a stop ring, and an engaging mechanism for keeping said pressing nut in said joint body;

said engaging mechanism comprising a first engaging groove and a second engaging groove, and an annular groove formed on an outer surface of said pressing nut for receiving said stop ring, wherein said first engaging groove and said second engaging groove are formed on an inner surface of said joint body for receiving said stop ring and communicating with each other; and each of said first engaging groove and said second engaging groove having a tapered groove, both tapered grooves adjacent to each other forming an annular projection having both inclined side surfaces, and said stop ring being movable in both directions between said first engaging groove and said second engaging groove passing said annular projection, whereby said stop ring engages both of said annular groove and said first engaging groove until the connection of said pipe is completed, and when a force in a drawing direction is applied to said pipe after completing the connection of said pipe, said stop ring moves from said first engaging groove to said second engaging groove on the inlet side thereof and said stop ring engages both of said annular groove and said second engaging groove, so that said pressing nut is drawn from said joint body to such an extent that the normal connection of said pipe can be confirmed.

2. The pipe joint according to claim 1, comprising a resilient means unlocked to expand when pushed by a tip end of said pipe, said sealing member pushed toward the inlet by the expansion of said resilient means sealing said pipe and said joint body.

3. The pipe joint according to claim 1, wherein a side surface of said annular projection has such an inclination angle that though said stop ring does not pass said annular projection by the action of said resilient means, said stop ring passes said annular projection by a force of drawing said pipe for the confirmation of connection.

4. The pipe joint according to claim 1, wherein said pressing nut is provided with an indicator, which is shielded by said joint body until the connection of said pipe is completed, and when said pipe is pulled after completing the connection, said pressing nut is drawn from said joint body, and said indicator appears from said joint body, so that the normal connection of said pipe can be confirmed.

5. The pipe joint according to claim 4, wherein said indicator is a ring detachably attached to said pressing nut.

6. The pipe joint according to claim 5, wherein when said pressing nut is pushed inward said joint body with said indicator ring detached from said pressing nut, said stop ring is received in a third engaging groove on the inward side of said first engaging groove to break engagement with said annular groove, so that said pressing nut can be removed from said joint body.

* * * * *